(12) United States Patent
Farmer et al.

(10) Patent No.: US 7,011,202 B2
(45) Date of Patent: Mar. 14, 2006

(54) CONVEYOR FOR MOVING FLAT BATTERY COMPONENTS

(75) Inventors: John E. Farmer, St. Petersburg, FL (US); Randy J. Erwin, St. Petersburg, FL (US)

(73) Assignee: Farmer Mold & Machine Works, Inc., St. Petersburg, FL (US)

( * ) Notice: Subject to any disclaimer, the term of this patent is extended or adjusted under 35 U.S.C. 154(b) by 785 days.

(21) Appl. No.: 10/266,174

(22) Filed: May 16, 2001

(65) Prior Publication Data

US 2003/0121143 A1 Jul. 3, 2003

Related U.S. Application Data

(62) Division of application No. 09/515,073, filed on Feb. 28, 2000, now Pat. No. 6,238,445, which is a division of application No. 09/088,158, filed on Jun. 1, 1998, now Pat. No. 6,038,962, which is a division of application No. 08/949,798, filed on Oct. 14, 1997, now Pat. No. 5,900,030.

(60) Provisional application No. 60/028,394, filed on Oct. 15, 1996.

(51) Int. Cl.
*B65G 15/64* (2006.01)

(52) U.S. Cl. .............................. 198/345.3; 198/459.6; 198/463.4; 414/222.04; 414/222.06

(58) Field of Classification Search ............. 198/345.1, 198/345.3, 459.6, 463.4; 414/222.04, 222.06
See application file for complete search history.

(56) References Cited

U.S. PATENT DOCUMENTS

| | | | |
|---|---|---|---|
| 1,736,188 A | 11/1929 | Daesen et al. | |
| 1,855,767 A | 4/1932 | Neuman | |
| 2,200,887 A | 5/1940 | Lockwood | |
| 2,271,119 A | 1/1942 | Cox et al. | |
| 2,626,038 A | 1/1953 | Smith | |
| 2,846,740 A | 8/1958 | Edstrand | |
| 3,385,473 A | 5/1968 | Forcesi | |
| 3,441,448 A | 4/1969 | Hayward et al. | |
| 3,448,898 A | 6/1969 | Bennett | |
| 3,510,116 A | 5/1970 | Harvill et al. | |
| 3,778,314 A | 12/1973 | Kano et al. | |
| 3,883,369 A | 5/1975 | Badger et al. | |
| 3,908,741 A | 9/1975 | Keizer | |

(Continued)

FOREIGN PATENT DOCUMENTS

SU          301372          5/1972

(Continued)

*Primary Examiner*—Joe Dillon, Jr.
(74) *Attorney, Agent, or Firm*—Frijouf, Rust & Pyle P.A.

(57) ABSTRACT

A conveyor system is disclosed for sequentially moving a plurality of flat battery components. The conveyor has a plurality of separators for receiving a flat battery component between each of the adjacent separators. The conveyor supports an end of each flat battery component with each of the flat battery components being maintained on end by the plurality of separators. A motor drive is provided for moving the conveyor for moving the plurality of flat battery components.

5 Claims, 19 Drawing Sheets

U.S. PATENT DOCUMENTS

| | | |
|---|---|---|
| 4,001,066 A | 1/1977 | Channing et al. |
| 4,296,546 A | 10/1981 | Hill et al. |
| 4,457,419 A * | 7/1984 | Ogami et al. ............ 198/345.1 |
| 4,525,923 A | 7/1985 | Alvarez |
| 4,969,389 A | 11/1990 | Foster |
| 5,117,739 A | 6/1992 | Maher et al. |
| 5,146,974 A | 9/1992 | Mayer et al. |
| 5,234,473 A | 8/1993 | Piper et al. |
| 5,746,781 A | 5/1998 | Velasquez et al. |
| 5,829,571 A * | 11/1998 | Mizuta et al. ............ 198/345.1 |
| 5,834,743 A | 11/1998 | Lund et al. |
| 5,882,362 A | 3/1999 | Muffoletto et al. |
| 5,900,030 A | 5/1999 | Farmer et al. |
| 6,038,962 A | 3/2000 | Farmer et al. |

FOREIGN PATENT DOCUMENTS

SU 547289 5/1974

* cited by examiner

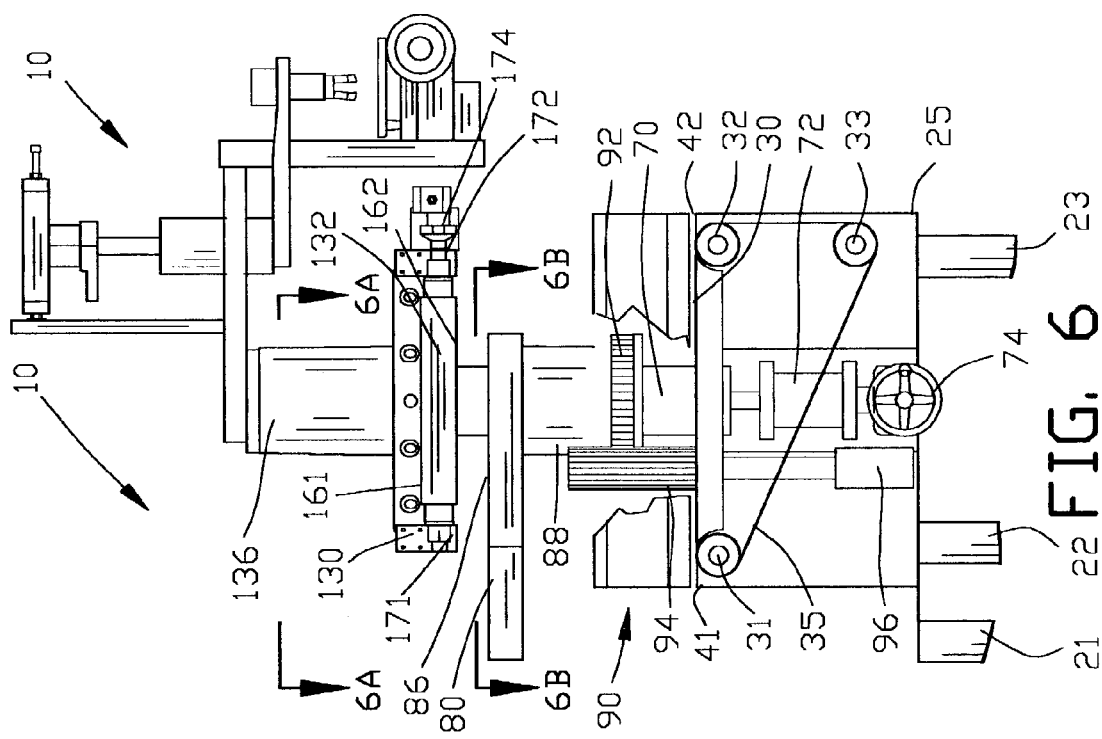
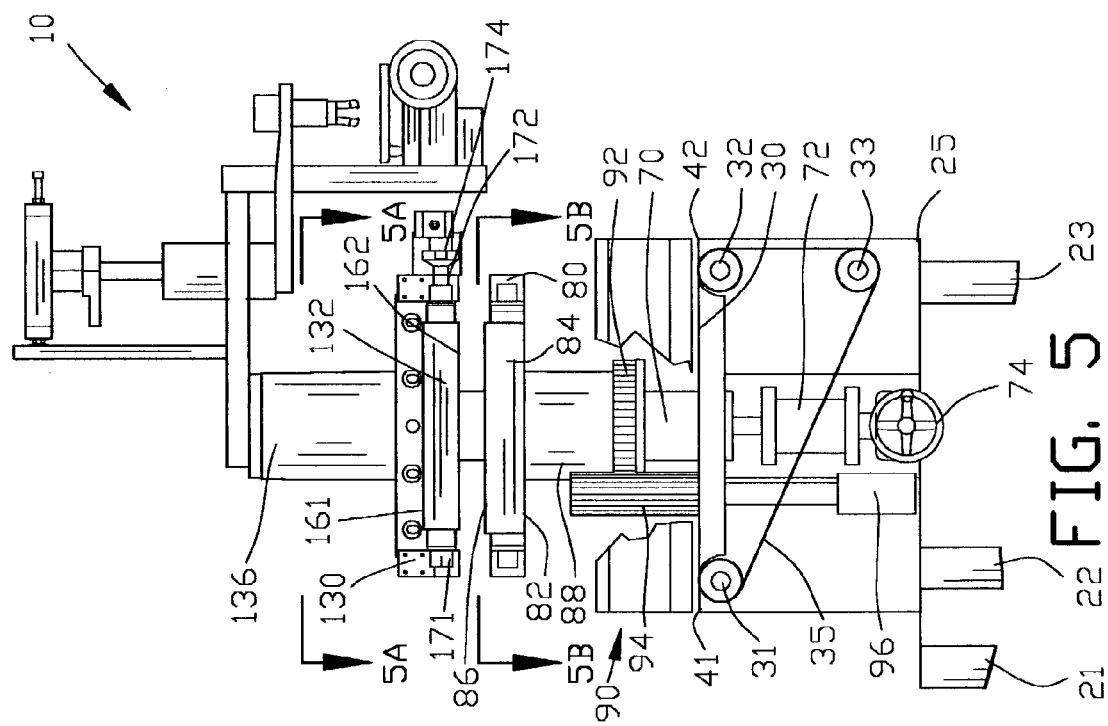

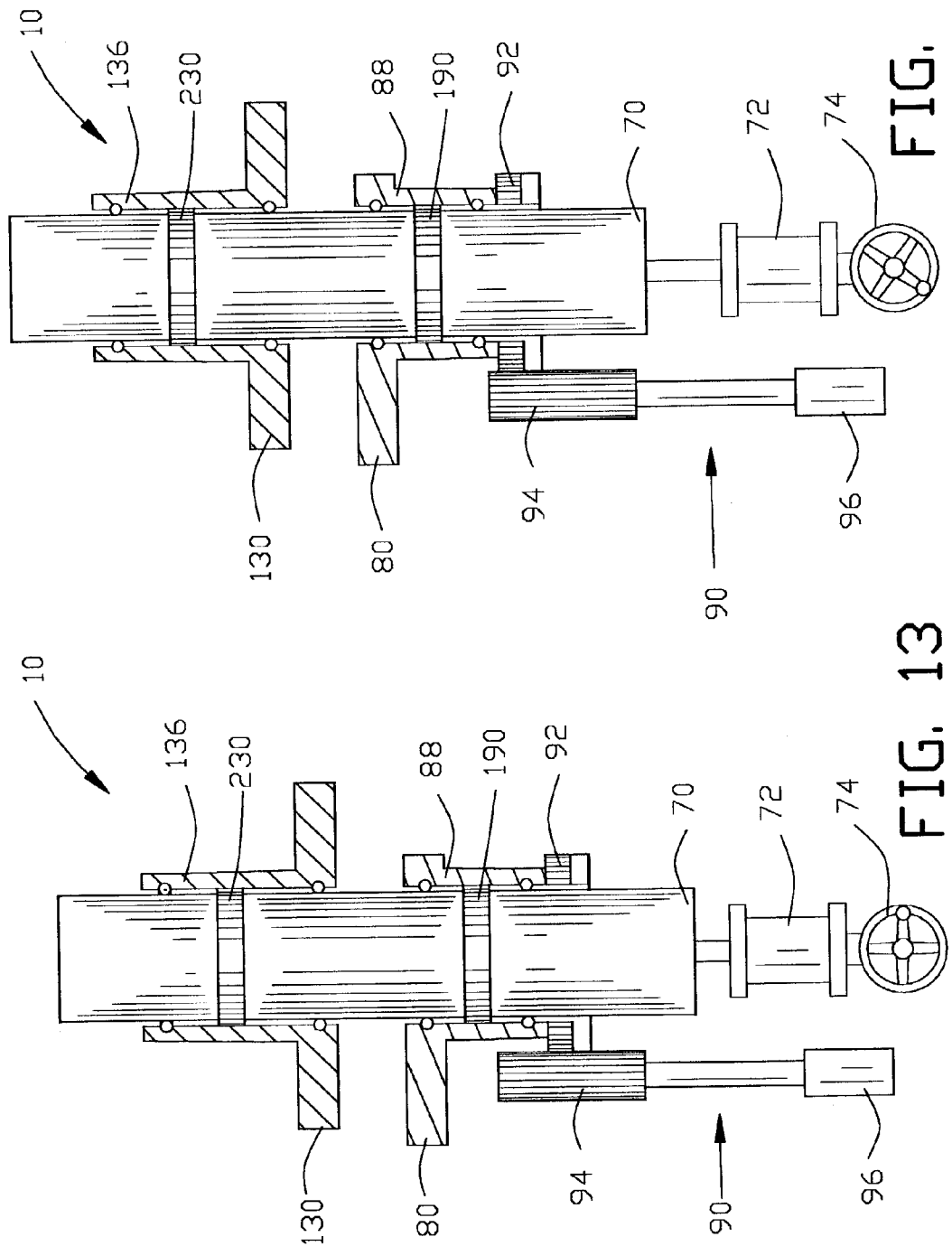

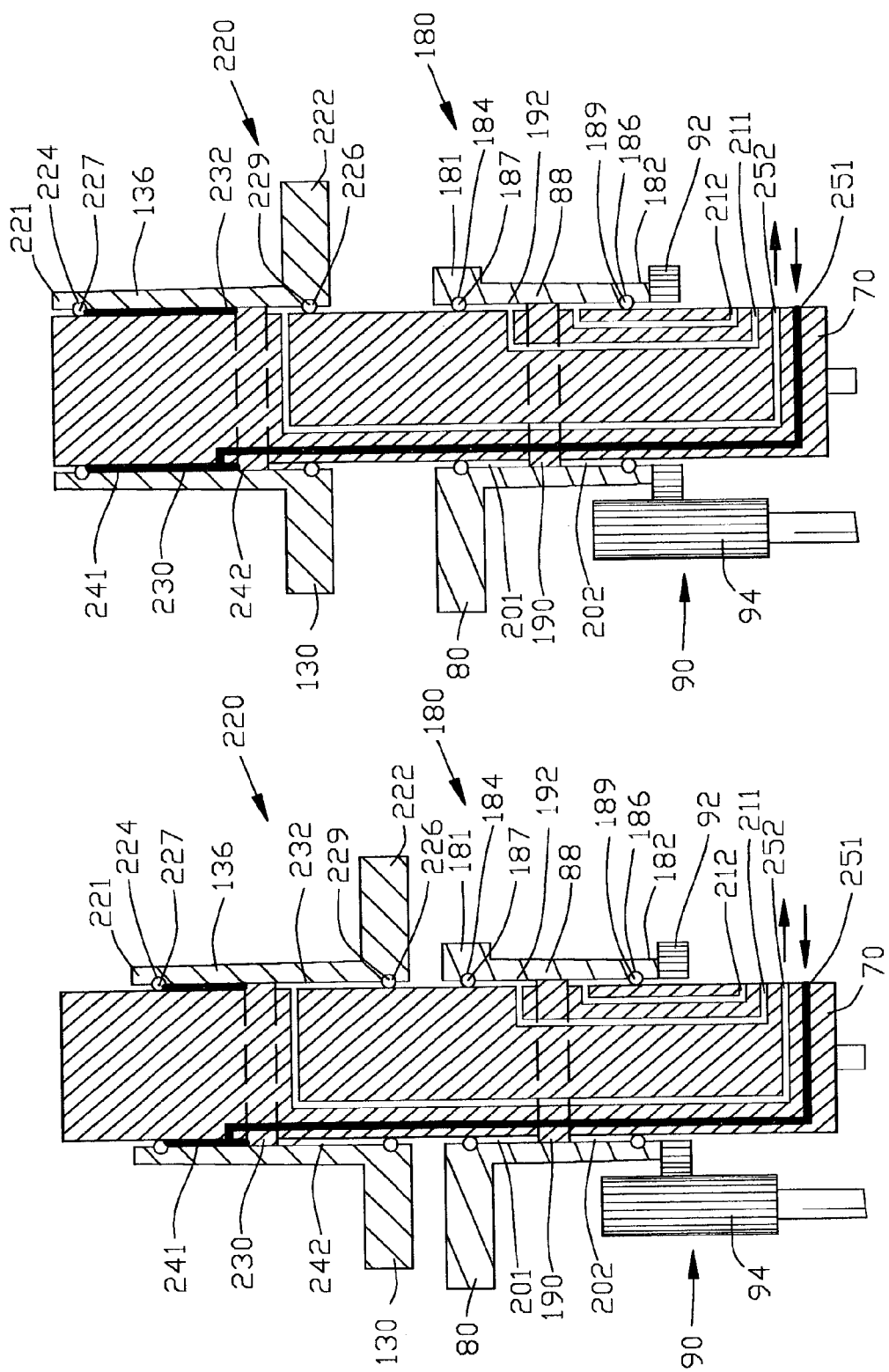

CONVEYOR FOR MOVING FLAT BATTERY COMPONENTS

CROSS REFERENCE TO RELATED APPLICATIONS

This application claims the benefit of United States Provisional application Ser. No. 60/028,394 filed Oct. 15, 1996. All subject matter set forth in provisional application Ser. No. 60/028,394 is hereby incorporated by reference into the present application as if fully set forth herein.

This application is a divisional of Application Ser. No. 09/515,073 filed Feb. 28, 2000 now U.S. Pat. No. 6,238,445. Application Ser. No. 09/515,073 is a divisional of U.S. Pat. No. 6,038,962, Application Ser. No. 09/088,158 filed Jun. 1, 1998 now U.S. Pat. No. 6,038,962. Application Ser. No. 09/088,158 is a divisional of Application Ser. No. 08/949,798 filed Oct. 14, 1997 now U.S. Pat. No. 5,900,030 the disclosures of which are incorporated herein by reference.

BACKGROUND OF THE INVENTION

1. Field of the Invention

This invention relates to the construction of electrical storage batteries and more specifically, to an improved apparatus for assembling a battery.

2. Background of the Invention

The fabrication and assembly of an electric storage battery such as a lead acid storage battery have undergone major changes over the decades. The changes in the fabrication and assembly of an electric storage battery have been implemented to increase the reliability of the electric storage battery, to reduce the material cost of the electric storage battery and reduce the labor cost associated with the assembly of the electric storage battery.

Many assembly processes of the electric storage battery have been automated to reduce the overall cost of manufacture. One process in the assembly of the electric storage battery that has been automated is the process of sealing a battery case closure to a battery case.

Typically, the battery case comprises a rectangular open top case having a plurality of intercell partition walls. A plurality of battery plates are respectively received between the plurality of intercell partition walls for forming a plurality of battery cells. The plurality of battery plates between the plurality of partition intercell walls are interconnected by intercell connectors extending through or over the intercell partition walls. The intercell connectors connect the plurality of battery plates between the plurality of partition intercell walls in an electrical series configuration.

In most battery designs, a positive and negative battery post extends upwardly from the battery plates at opposed ends of the battery case for providing a positive pole at one end of the battery case and a negative pole on the other end of the battery case. In these battery designs, the positive and negative battery posts extend above the level of the battery case.

In many battery designs, a battery case closure includes a positive and negative battery bushing secured to tho battery case closure. When the battery case closure is placed over the battery case, the positive and negative battery posts are received within the positive and negative bushings of the battery case closure. The batter case closure is sealed to the battery case by a heat sealing process. Thereafter, the positive and negative battery posts are electrically connected to a positive and negative battery bushings.

The prior art has provided numerous battery case sealing machines for heat sealing a battery case closure to a battery case. In general, these battery case sealing machines heated the upper surfaces of the sidewalls, the intercell walls and end walls of the battery case and simultaneously heat the sidewalls and end walls of the battery case closure. After the battery case and battery case closure were at least partially molten, the battery case closure was moved into engagement with the battery case allowing the molten surfaces of the battery case closure and the battery case to unite for sealing the battery case closure to the battery case.

Unfortunately, the battery case sealing machines of the prior art had numerous disadvantages. Firstly, the battery case sealing machines of the prior art did not always provide a uniform seal about the upper surface of the sidewalls, the intercell walls and end walls of the battery case. Secondly, the battery case sealing machines of the prior art were large and occupied a substantial volume on a production battery assembly line. Thirdly, the battery case sealing machines of the prior art were slow in operation. Fourthly, the battery case sealing machines of the prior art required an extensive amount of time for altering the machine for accommodating for a different size of battery case.

Therefore, it is an object of the present invention to provide an improved apparatus and method for assembling a battery.

Another object of this invention is to provide an improved apparatus for sealing a battery case closure to a battery case that overcomes the difficulties of the prior art battery case sealing machines.

Another object of this invention is to provide an improved apparatus for sealing a battery case closure to a battery case incorporating a unique single column configuration for providing increased accuracy and speed of the operation of the apparatus.

Another object of this invention is to provide an improved apparatus for sealing a battery case closure to a battery case incorporating a unique single column configuration for providing increased accessibility to the apparatus for easy cleaning and alteration.

Another object of this invention is to provide an improved apparatus for sealing a battery case closure to a battery case for providing increased speed in interchanging a heater platen for accommodating for a different size battery case.

Another object of this invention is to provide an improved apparatus for sealing a battery case closure to a battery case with independent control of the melting time of the battery case and the battery closure.

Another object of this invention is to provide an improved apparatus for sealing a battery case closure to a battery case with increased control of the melting depth of the battery case and the battery closure.

Another object of this invention is to provide an improved apparatus for sealing a battery case closure to a battery case with increased control of the pressure of engagement between the melted battery closure and the melted battery case.

Another object of this invention is to provide an improved apparatus for sealing a battery case closure to a battery case with increased control of the time of engagement between the melted battery closure and the melted battery case.

Another object of this invention is to provide an improved apparatus for sealing a battery case closure to a battery case having improved alignment between the battery closure and the battery case.

Another object of this invention is to provide an improved apparatus for sealing a battery case closure to a battery case incorporating an improved conveyor for moving the battery case relative to the apparatus.

Another object of this invention is to provide an improved apparatus for sealing a battery case closure to a battery case incorporating an automated battery closure loader for automatically loading the battery case closures on the apparatus.

Another object of this invention is to provide an improved apparatus for sealing a battery case closure to a battery case incorporating a battery closure conveyor for sequentially moving a plurality of battery case covers to the apparatus for automatic loading thereon.

Another object of this invention is to provide an improved apparatus for sealing a battery case cover to a battery case for providing increased speed in interchanging a battery closure receiver for accommodating for a different size battery case.

Another object of this invention is to provide an improved apparatus for sealing a battery case closure to a battery case incorporating a rotatable closure receiver being rotatable about a horizontal axis for enabling a closure to be loaded onto the closure receiver while a battery closure is awaiting heating by the apparatus.

Another object of this invention is to provide an improved apparatus and method for assembling a battery having a device for moving a carrier with fluid pressure through fluid conduits disposed internal a shaft.

Another object of this invention is to provide an improved apparatus and method for assembling a battery having a novel case stop for stopping and positioning a battery case on a support.

Another object of this invention is to provide an improved apparatus and method for assembling a battery having a control system for controlling the movement of a case heater during a battery case heating process.

Another object of this invention is to provide an improved apparatus and method for assembling a battery having a conveyor for sequentially moving a plurality of flat battery components such as case closures.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved apparatus for sealing a battery case closure to a battery case comprising a horizontal conveyor for moving the case into a sealing position adjacent to a vertical column. A platen carrier is vertically and rotationally movable relative to the column. A platen is mounted to the platen carrier with the platen comprising a case heater. A receiver carrier is vertically movable relative to the column. A closure receiver is mounted to the receiver carrier with the closure receiver having a closure retainer for retaining a closure thereby. A platen carrier drive vertically and rotationally moves the platen carrier to locate the case heater for heating the case thereby. The platen carrier drive vertically and rotationally moves the platen carrier to relocate the case heater from heating the case. A receiver carrier drive vertically moves the receiver carrier to position the closure into engagement with the case to heat seal the closure to the case.

In a more detailed embodiment of the invention, the apparatus includes a base for supporting the vertical column and an adjuster interposed between the base and the vertical column for adjusting the vertical positions of the receiver carrier and the closure receiver relative to the horizontal conveyor for accommodating for different size battery cases. The adjuster may be a jack interposed between the base and the vertical column. In another embodiment of the invention, the battery case is a plastic battery case and the horizontal conveyor comprises a non-stick belt for inhibiting the accumulation of melted plastic on the non-stick belt.

Preferably, the platen is removably mounted to the platen carrier for enabling the platen to be changed for accommodating for different size battery cases. The closure receiver is removably mounted to the receiver carrier for enabling the closure receiver to be changed for accommodating for different size battery cases. The platen includes a closure heater with a thermal insulator being disposed between the case heater and the closure heater for enabling the closure heater to be operated at a temperature independent of the case heater.

The platen carrier drive comprises the platen carrier defining a first and a second end. A first and a second seal is disposed at the first and a second ends of the platen carrier for sealing with the column. An annular projection extends from the column and is located between the first and second seals for defining a first and a second platen chamber. An input and an output channel communicates with each of the first and second platen chambers. A fluid pump pumps a fluid through selective input and output channels for expanding one of the first and second platen chambers and for contracting the other of the first and second platen chambers for vertically moving the platen carrier relative to the column. In one embodiment of the invention, the input and output channels extends within the column.

In another embodiment of the invention, the closure retainer comprises a plurality of apertures defined in the closure receiver and communicating with a vacuum source for retaining a closure on the closure receiver.

The invention may include a closure feeder for sequentially introducing a plurality of closures to the closure receiver. The closure feeder comprises a closure conveyor for moving the plurality of closures to a transfer arm. The transfer arm sequentially transfers the plurality of closures to the closure receiver.

The invention may include a closure receiver being rotatably mounted about a horizontal axis to the receiver carrier. The closure receiver has a closure retainer for retaining a closure thereby. The closure receiver has a first and a second closure receiver portion disposed on opposed sides of closure receiver. A closure receiver rotating drive rotates the closure receiver to a first rotational position for enabling the first closure receiver portion to receive a first closure. The closure receiver rotating drive rotates the closure receiver to a second rotational position for enabling the second closure receiver portion to receive a second closure.

The invention is also incorporated into an apparatus for moving a carrier with fluid pressure. The apparatus comprises a shaft having an annular piston extending from said shaft. A carrier drive drives the carrier. The carrier drive comprises a cylindrical barrel extending between a first and a second end members. The cylindrical barrel is in sealing engagement with said annular piston with said first and second end members being located on opposed sides of said annular piston. A first and a second seal coacts between said first and second end members and said shaft for defining a first and a second chamber. A first and a second channel extend through said shaft to communicate with said first and second chambers, respectively. A valve system connects the fluid pressure to said first and second channels for enabling said first chamber to expand upon the introduction of fluid pressure into said first chamber for moving said carrier drive in a first direction relative to said shaft. The valve system enables said second chamber to expand upon the introduction of fluid pressure into said second chamber for moving said carrier drive in a second direction relative to said shaft.

The invention is also incorporated into a case stop for stopping and positioning a battery case on a support. The case stop comprises a stop frame movably mounted relative to the support. A major and a minor case stop are located on said stop frame. The major case stop initially positions the battery case upon initial movement of said stop frame. The minor case stop subsequently positions the battery case upon continued movement of said stop frame.

The invention is also incorporated into the method of heating a battery case with a case heater. The method comprises rapidly relatively moving the case heater and the battery case into mutual engagement and slowly relatively moving the case heater and the heated battery case a predetermined distance to melt the battery case a predetermined distance.

The invention is also incorporated into a conveyor for sequentially moving a plurality of flat battery components. The conveyor system comprises a conveyor having a plurality of separators for receiving a flat battery component between each of adjacent separators. The conveyor supports an end of each of the flat battery components with each of the plurality of the flat battery components being maintained on end by the plurality of separators. A motor drive moves the conveyor for moving the plurality of flat battery components thereby.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 5 is an enlarged view of a portion of FIG. 1;
FIG. 6 is a view similar to FIG. 5 with a heating platen moved into a retracted position;
FIG. 13 is an enlarged view of a column of the present invention in a first adjusted position;
FIG. 13A is an enlarged view of the column of the present invention in a second adjusted position;
FIG. 14 is an enlarged view of the column of the present invention illustrating the closure receiver in a lowered position;
FIG. 14A is an enlarged view of the column of the present invention illustrating the closure receiver in a raised position.

Similar reference characters refer to similar parts throughout the several Figures of the drawings.

DETAILED DISCUSSION

Figure 1:
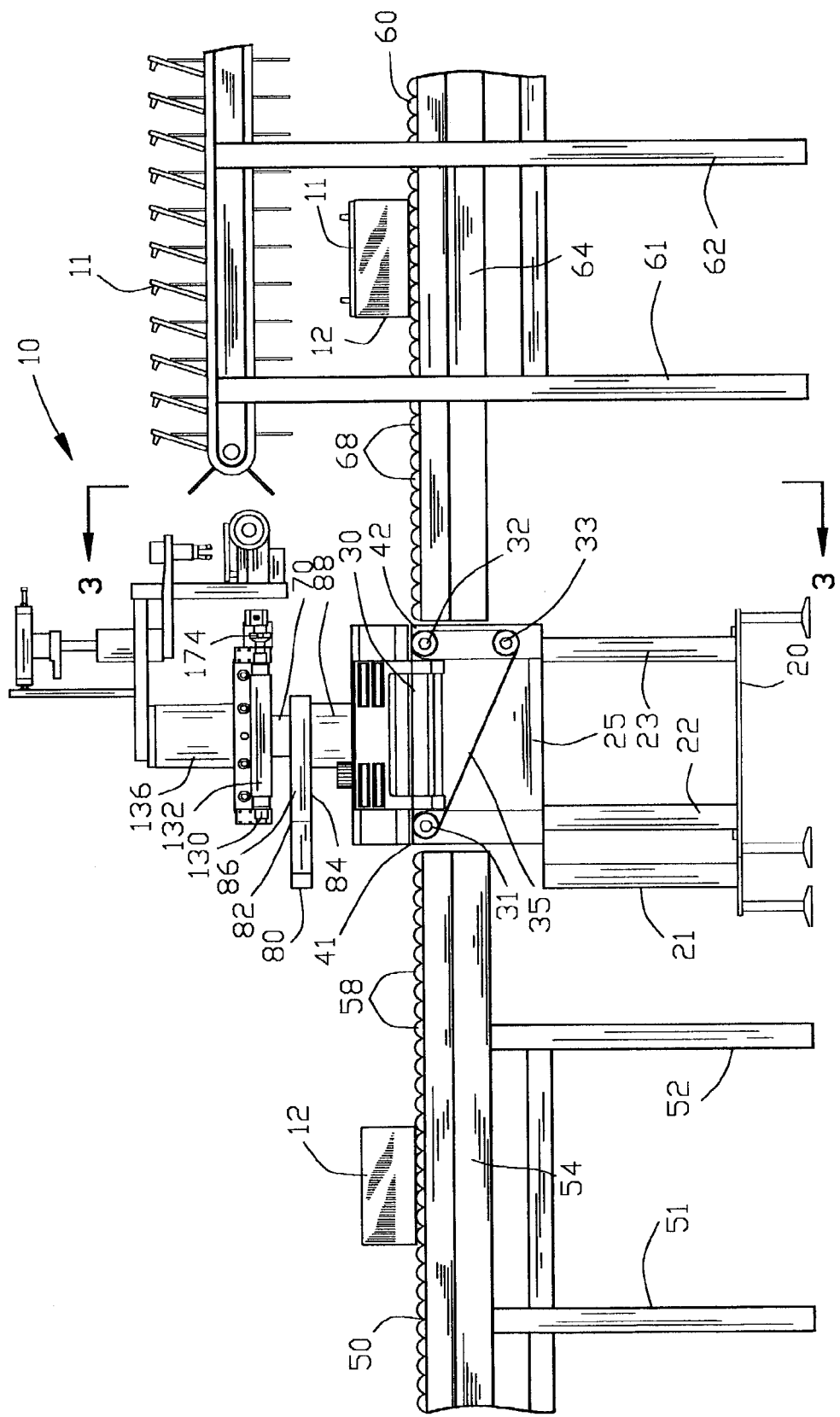
FIG. 1 is a front view of an apparatus incorporating the present invention.
Figure 3:
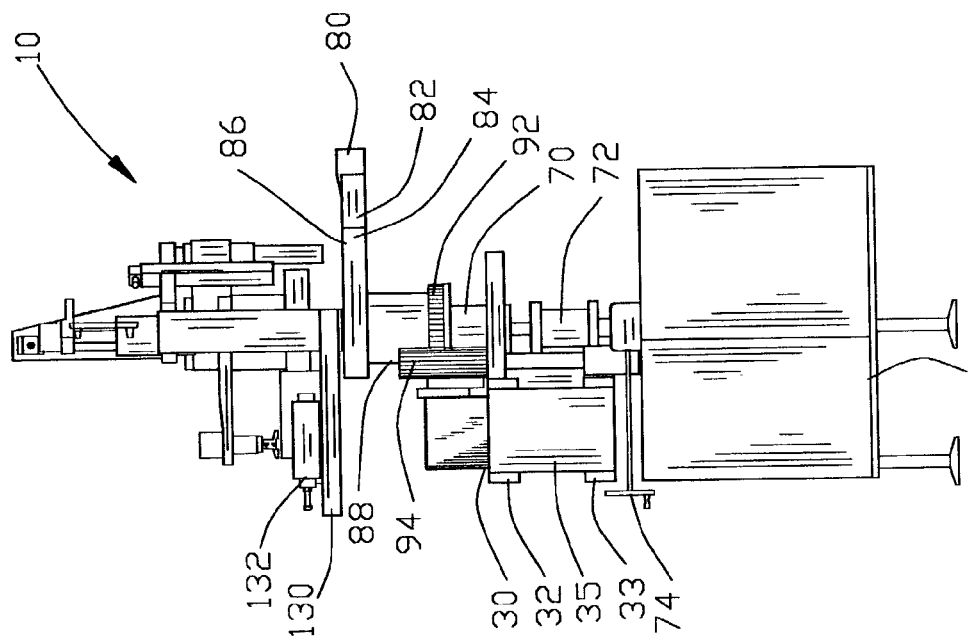
FIG. 3 is a view along line 3–3 in FIG. 1.
Figure 2:
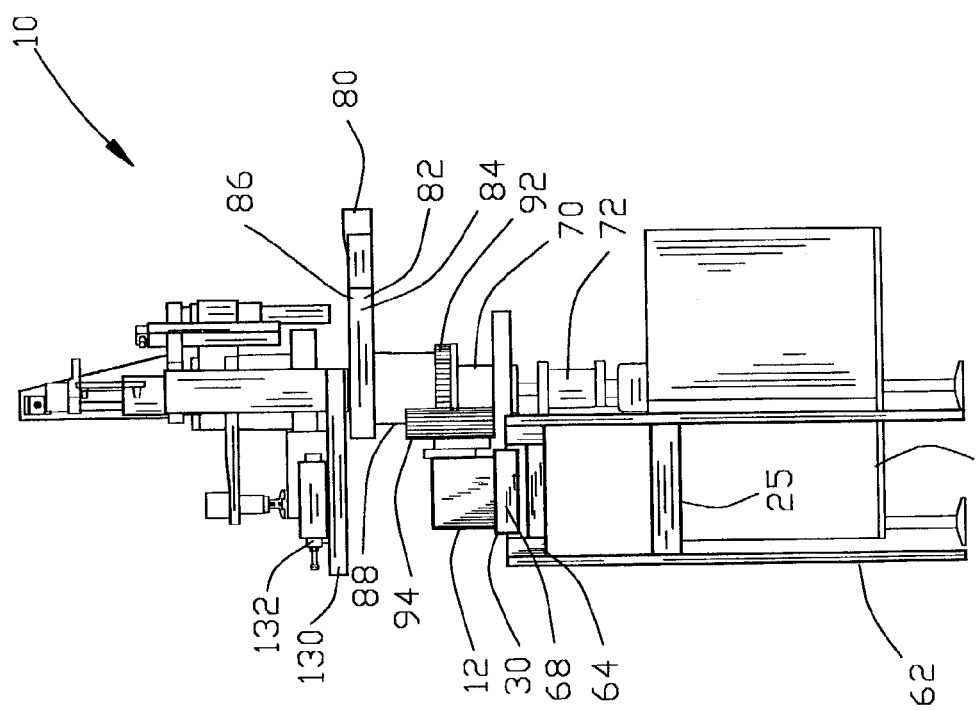
FIG. 2 is a right side view of FIG. 1.
Figure 4:
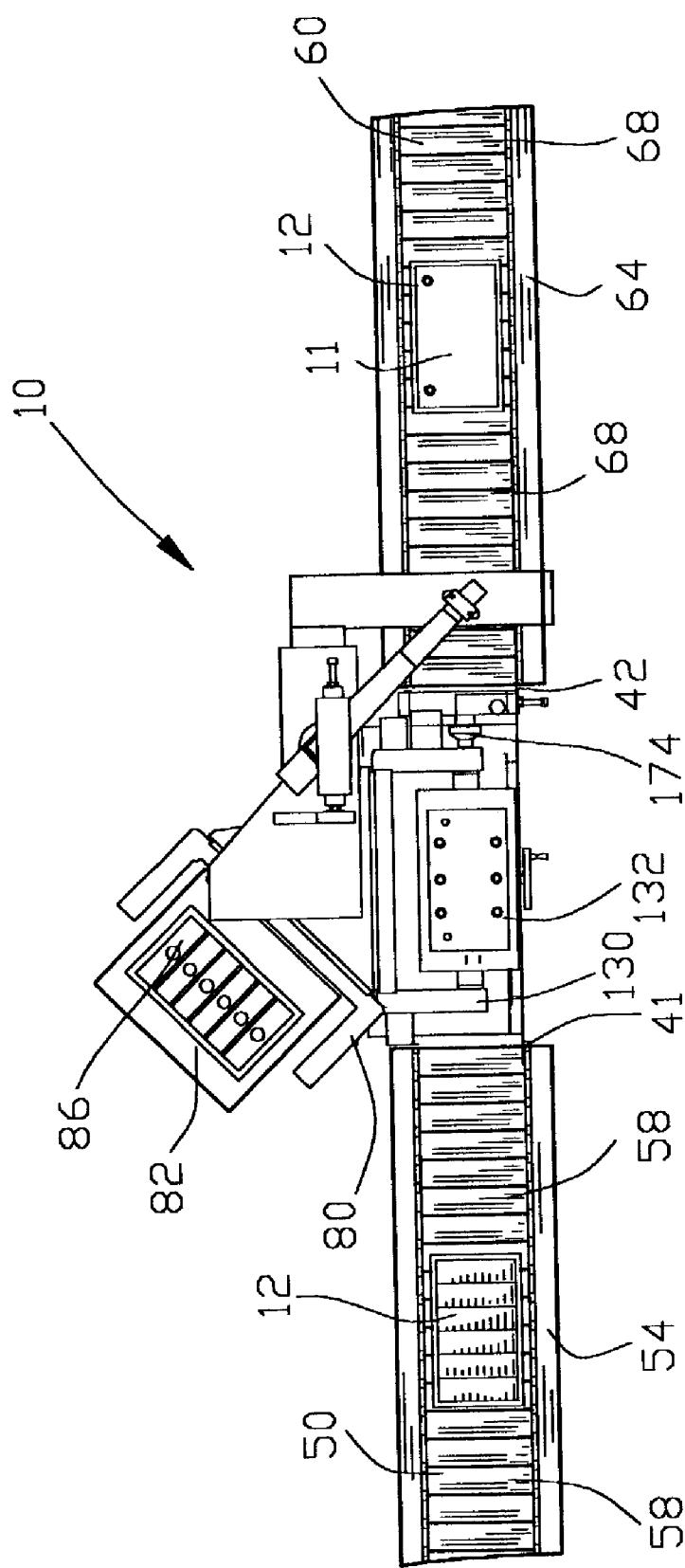
FIG. 4 is a top view of FIG. 1.

FIG. 1 is a side elevational view of an apparatus 10 for sealing a battery case closure 11 to a battery case 12. FIG. 2 is a right side view of FIG. 1 whereas FIG. 3 is a view along line 3—3 in FIG. 1 with FIG. 4 being a top view of FIG. 1. Although the battery case closure 11 has been shown as a cover, it should be understood that the battery closure 11 may be any closure such as a bottom closure or multiple closures such as a top and a bottom of the battery case or sides of the battery case.

The apparatus 10 comprises a base 20 having a plurality of legs 21–23 for supporting a frame 25. The frame 25, supports a horizontal conveyor 30 comprising a plurality of rollers 31–33 for suspending an endless belt 35. Preferably, roller 31 is driven by a roller drive such as an electric or fluid motor (not shown) for driving the endless belt 31 and for moving batteries between an input 41 of the apparatus 10 and an output 42. Preferably, the endless belt 31 is made of a non-stick material such as a material sold under the trademark KEVLAR. The non-stick material of the endless belt 31 inhibits the accumulation of melted plastic material on the non-stick belt from the battery case and/or battery closure material. Furthermore, the non-stick material of the endless belt 31 makes the endless belt 31 easier to remove melted plastic material from the endless belt 31.

An input conveyor 50 comprises a plurality of legs 51 and 52 for supporting an input conveyor frame 54. The input conveyor frame 54 includes a plurality of rollers 58 for moving battery cases along a horizontal path into the input 41 of the apparatus 10. Preferably, the rollers 58 of the input conveyor 50 are driven by a roller drive such as an electric or fluid motor (not shown) for moving battery cases 12 to the input 41 of the apparatus 10.

An output conveyor 60 comprises a plurality of legs 61 and 62 for supporting an output conveyor frame 64. The output conveyor frame 64 includes a plurality of rollers 68 for moving battery cases 12 along a horizontal path from the output 42 of the apparatus 10. Preferably, the rollers 69 of the output conveyor 60 are driven by a roller drive such as an electric or fluid motor (not shown) for moving battery cases 12 from the output 42A of the apparatus 10.

FIG. 5 is an enlarged view of a portion of FIG. 1 illustrating the apparatus 10 as comprising a vertical column 70 which is supported by the base 25. An adjuster 72 is interposed between the base 25 and the vertical column 70 for adjusting the vertical position of the vertical column 70 relative to the horizontal conveyor 30. Preferably, the adjuster 72 is a jack (not shown) incorporating an adjustment handle 74 for adjusting the vertical position of the vertical column 70 for accommodating for a different size battery case 12. Although the adjustment handle 74 is shown as a manual adjustment handle 74, it should be understood that the manual adjustment handle 74 may be automatically adjusted through the use of an electric or fluid motor (not shown). Furthermore, the automatic adjustment of the adjustment handle 74 may be controlled by computer operation. The adjuster 72 rapidly accommodates for a different height battery case for enabling a speedy changeover for manufacturing a different size of battery.

FIG. 6 is a view similar to FIG. 5 with a platen carrier 80 and a platen 82 being moved from a first rotational position shown in FIG. 5 to a second rotational position shown in FIG. 6. The platen carrier 80 is vertically and rotationally movable relative to the vertical column 70. The platen 82 is mounted to the platen carrier 80 with the platen comprising a case heater 84 and a closure heater 86. The platen carrier 80 comprises a cylindrical barrel 88 for vertically and rotationally mounting the platen carrier 80 relative to the vertical column 70.

Figure 5A:
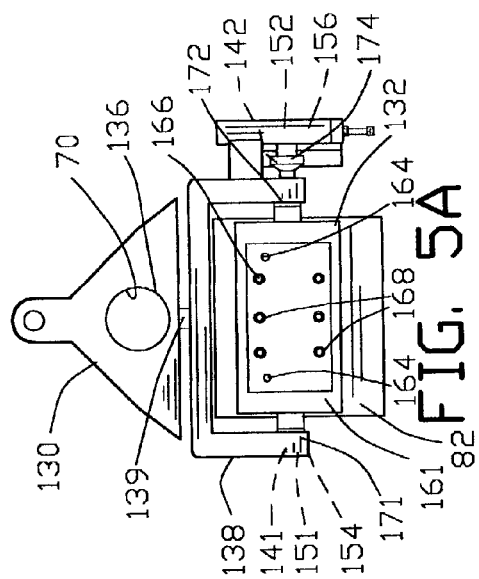
FIG. 5A is a sectional view along line 5A–5A in FIG. 5.
Figure 5B:
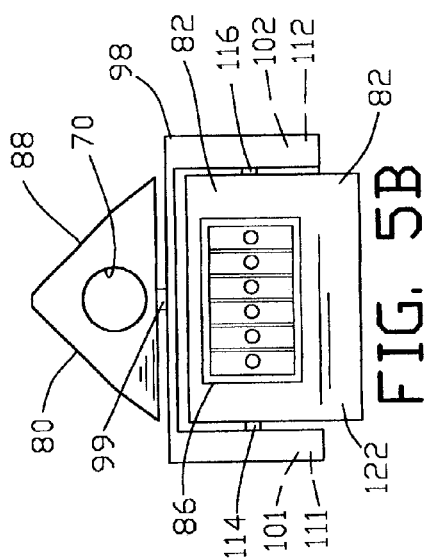
FIG. 5B is a sectional view along line 5B–5B in FIG. 5.
Figure 6A:
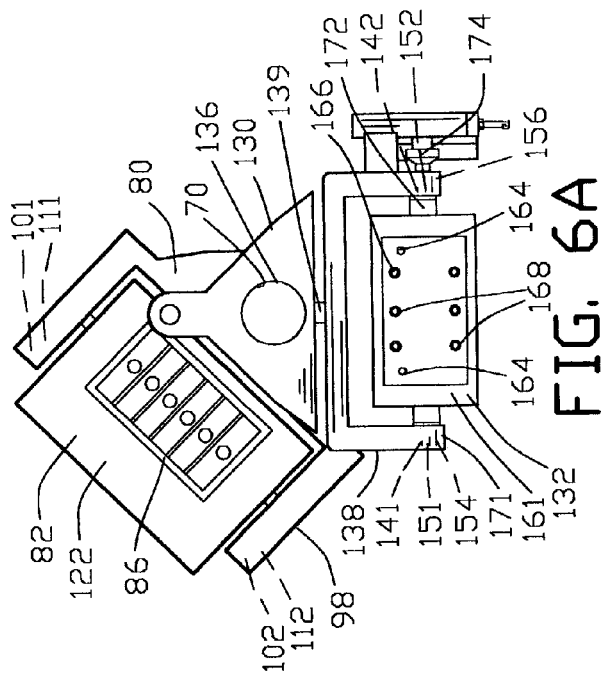
FIG. 6A is a sectional view along line 6A–6A in FIG. 6.
Figure 6B:
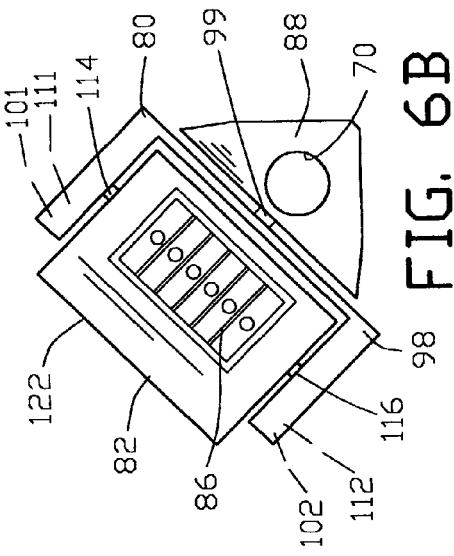
FIG. 6B is a sectional view along line 6B–6B in FIG. 6.

A platen carrier rotating drive 90 rotates the platen carrier 80 between the first rotary position shown in FIGS. 5A and 5B and a second rotary position shown in FIGS. 6, 6A and 6B. The platen carrier rotating drive 90 includes the cylindrical barrel 88 having a gear 92 cooperating with a pinion gear 94. The pinion gear 94 is driven by a motor 96 such as an electric or fluid motor for moving the platen carrier 80 between the first rotary position shown in FIGS. 5, 5A and 5B and a second rotary position shown in FIGS. 6, 6A and 6B.

Figure 7:
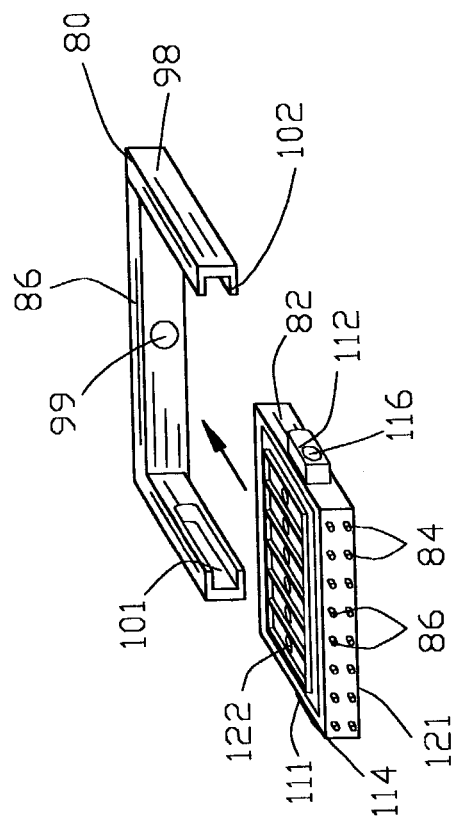
FIG. 7 is an enlarged exploded isometric view of a heater platen of the present apparatus.

FIG. 7 is an enlarged exploded isometric view of the platen carrier 80 and the platen 82. The cylindrical barrel 88 of the platen carrier 80 supports a generally U-shape mounting 98. Preferably, the generally U-shaped mounting 98 is secured to the cylindrical barrel 88 by a pivot 99. The generally U-shape mounting 98 includes a first and a second slot 101 and 102 for slidably receiving a first and a second platen projection 111 and 112 extending from opposed ends of the platen 82. The first and second platen projections 111 and 112 are secured to the platen 82 by pivots 114 and 116. The pivot 99 enables the platen 82 to pivot in a first dimension relative to the horizontal conveyor 30 whereas the pivots 114 and 116 enable the platen 82 to pivot in a second dimension relative to the horizontal conveyor 30. The pivoting of the platen 82 in two dimensions relative to the horizontal conveyor 30 allows the downwardly facing portion 121 of the case heater 84 to heat the entire upper perimeter of the battery case 12 notwithstanding any defects in the upper periphery of the battery case 12. For example, some portions of the upper perimeter of the battery case 12 may vary two to four hundredths of an inch from other portions of the upper perimeter of the battery case 12. The pivots 99, 114 and 116 allow the case heater 84 to engage with the entire perimeter of the battery case 12 irrespective of these defects in the upper periphery of the battery case 12 to ensure that the entire periphery of the battery case 12 is properly heated for enabling the closure 11 to be properly sealed to the battery case 12.

Figure 8:
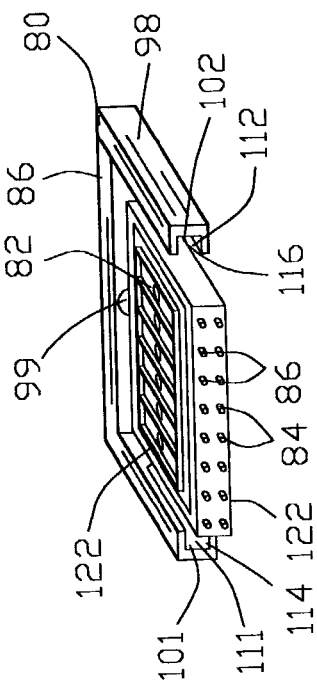
FIG. 8 is an assembled isometric view of the heater platen of FIG. 7.

FIG. 8 illustrates the first and second platen projections 111 and 112 being slidably received within the first and second slots 101 and 102. The first and second platen projections 111 and 112 and the first and second slots 101 and 102 enables the platen 82 to be readably interchanged with a standby platen (not shown) when it is desired to seal a different size battery case closure to a battery case. Since the platen 82 is readily interchangeable, the standby platen (not shown may be heated in a standby condition and interchanged with the platen 82 disposed on platen carrier 80 while both the platen 82 and the standby platen (not shown) are in a heated condition. This eliminates the need for down time on the production line caused by the time required for the standby platen (not shown) to obtain a proper operating temperature.

Figure 9:
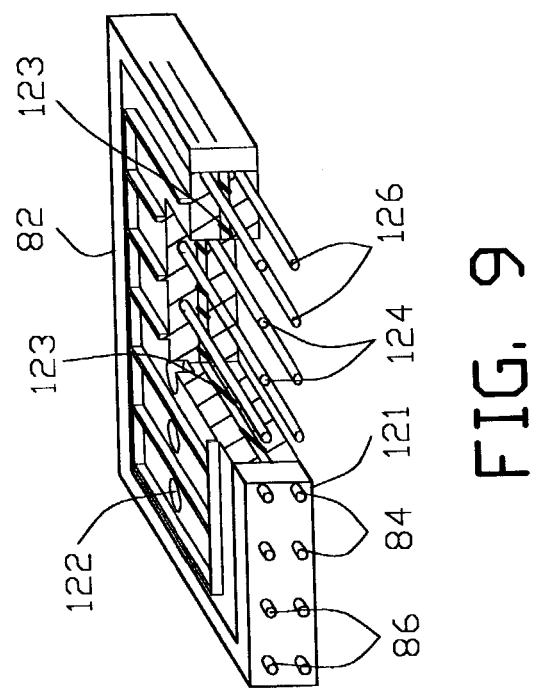
FIG. 9 is an enlarged partial view of FIG. 8.

FIG. 9 is an enlarged partial view of FIG. 8 illustrating the platen 82 including the case heater 84 being disposed on a downwardly facing portion 121 and the closure heater 86 being disposed on an upwardly facing portion 122. Preferably, the case heater 84 and the closure heater 86 are separated by an insulator 123. The case heater 84 includes case heating elements 124 whereas the closure heater 86 includes closure heating elements 126. Preferably, each of the case heating elements 124 and the heating elements 126 have an independent temperature controls (not shown). Accordingly, the temperature of the case heater 84 for heating the battery cases 12 may be set independently of the temperature of the closure heater 86 for heating the battery closures 11.

FIGS. 1–6 illustrate a receiver carrier 130 being mounted relative to the column 70 for vertically moving a closure receiver 132 between a third vertical position shown in FIGS. 5 and 6 and a fourth vertical position.

As best shown in FIGS. 5, 6, 5A and 6A, the receiver carrier 130 comprises a cylindrical barrel 136 for vertically mounting the receiver carrier 130 relative to the vertical column 70. The cylindrical barrel 136 of the receiver carrier 130 supports a generally U-shape mounting 138.

Figure 10:
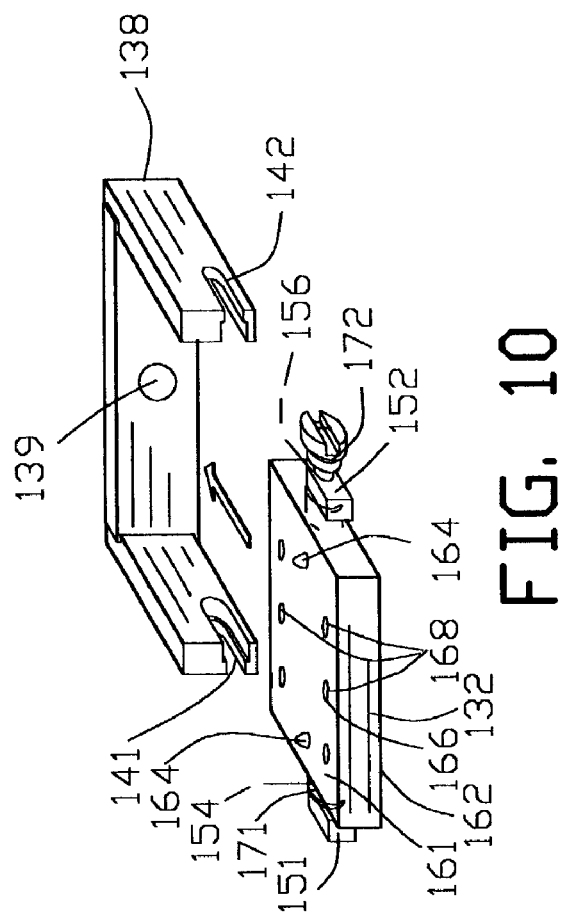
FIG. 10 is an enlarged exploded isometric view of a closure receiver of the present apparatus.

FIG. 10 is an enlarged exploded isometric view of the receiver carrier 130 and the closure receiver 132. The generally U-shape mounting 138 includes first and a second slot 141 and 142 for slidably receiving a first and a second closure receiver projection 151 and 152 extending from opposed ends of the closure receiver 132.

Figure 11:
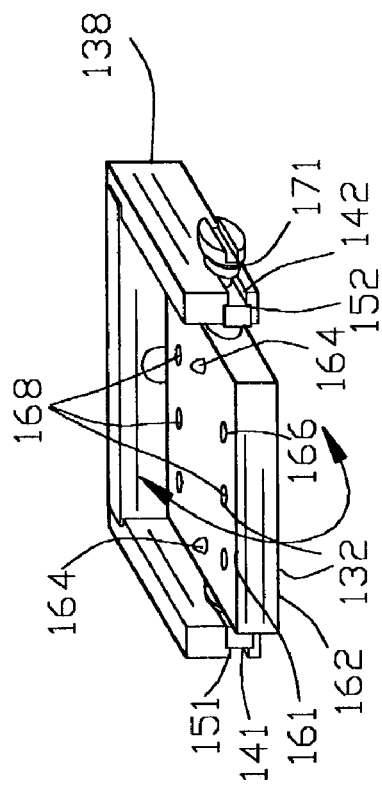
FIG. 11 is an assembled isometric view of the closure receiver of FIG. 10.

FIG. 11 illustrates the first and second closure receiver projection 151 and 152 being slidably received within the first and second slots 141 and 142. The first and second closure receiver projections 151 and 152 and the first and second slots 141 and 142 enables the closure receiver 132 to be interchanged with a standby closure receiver (not shown) when it is desired to seal a different size battery case closure to a battery case.

Figure 12:
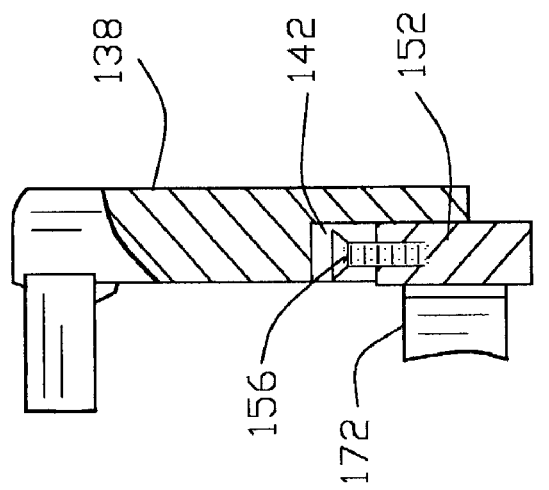
FIG. 12 is an enlarged partial view of FIG. 11.

FIG. 12 is an enlarged partial view of FIG. 11 illustrating a first and a second adjustable stop 154 and 156 shown as threaded stops. The first and second adjustable stops 154 and 156 enable the proper positioning of the first and second closure receiver projections 151 and 152 within the first and second slots 141 and 142. The first and second adjustable stops 154 and 156 enables the closure receiver 132 to be rapidly interchanged with a standby closure receiver (not shown). This eliminates the need for down time on the production line caused by the time required for changing the closure receiver 132. Preferably, stops of similar construction are incorporated into the first and second platen projections 111 and 112 shown in FIGS. 7 and 8.

As best shown in FIG. 10, the closure receiver 132 comprises a first and a second closure receiver portion 161 and 162 disposed on opposed sides of the closure receiver 132. Each of the first and second closure receiver portions 161 and 162 include a plurality of alignment cones 164 for engaging with apertures within the battery closure 11. The plurality of alignment cones 164 align the battery closure 11 relative to each of the first and second closure receiver portions 161 and 162.

Each of the first and second closure receiver portions 161 and 162 include a closure retainer 166 for retaining a battery closure 11 on each of the first and second closure receiver portions 161 and 162. Preferably, the closure retainers 166 comprise a plurality of vacuum cups 168 connected to a vacuum source (not shown). The plurality of vacuum cups 168 retain the battery closure 11 in the aligned position on the plurality of alignment cones 164 on each of the first and second closure receiver portions 161 and 162. Although the closure retainers 166 has been shown as a plurality of vacuum cups 168. It should be understood that the closure retainers 166 may be mechanical devices.

The closure receiver 132 comprises a first and a second rotatable mount 171 and 172 for rotatably mounting the closure receiver 132 to the receiver carrier 130. A closure receiver rotating drive 174 rotates the closure receiver 132 between a first and a second rotational position. In the first rotational position, the first closure receiver portion 161 faces upwardly. In the second rotational position, the second closure receiver portion 162 faces upwardly. Preferably, the closure receiver rotating drive 174 is a motor such as a fluid or an electric motor.

FIG. 13 is an enlarged view of the column 70 in a first adjusted position whereas FIG. 13A is an enlarged view of the column 70 in a second adjusted position. The adjuster 72 adjusts the vertical position of the vertical column 70 relative to the horizontal conveyor 30. The adjuster 72 is shown as a jack incorporating an adjustment handle 74 for adjusting the vertical position of the vertical column 70 for accommodating for a different size battery case 12. It should be understood that the manual adjustment handle 74 may be automatically adjusted through the use of a computer control. As the column 70 is adjusted between the first adjusted position shown in FIG. 13 and the second adjusted position shown in FIG. 13A, the gear 92 secured to the cylindrical barrel 88 maintains engagement with the pinion gear 94 independent of the vertical position of the column 70.

FIGS. 14 and 14A illustrate a platen carrier drive 180 and a receiver carrier drive 220 for respectively vertically moving the platen carrier 80 and the receiver carrier 130 on the column 70. The platen carrier drive 180 comprises the cylindrical barrel 88 having a first and a second end member 181 and 182 adjacent a first and a second O-ring groove 184 and 186. A first and a second O-ring 187 and 189 is disposed within the first and second grooves 184 and 186 with the first and second end members 181 and 182 retaining the first and second O-rings 187 and 189 within the first and second grooves 184 and 186. The first and second O-rings 187 and 189 seal the first and second end members 181 and 182 of the cylindrical barrel 88 to the column 70. An annular piston 190 extends from the column 70 to be in sealing engagement with a cylindrical wall 192 of the cylindrical barrel 88 to define a first and a second chamber 201 and 202. A first and second conduit 211 and 212 extend through the column 70 and communicate with the first and second chambers 201 and 202, respectively.

In a similar manner, the receiver carrier drive 220 comprises the cylindrical barrel 136 having a first and a second end member 221 and 222 adjacent a first and a second O-ring groove 224 and 226. A first and a second O-ring 227 and 229 is disposed within the first and second grooves 224 and 226 with the first and second end members 221 and 222 retaining the first and second O-rings 227 and 229 within the first and second grooves 224 and 226. The first and second O-rings 227 and 229 seal the first and second end members 221 and 222 of the cylindrical barrel 136 to the column 70. An annular piston 230 extends from the column 70 to be in sealing engagement with a cylindrical wall 232 of the cylindrical barrel 136 to define a first and a second chamber 241 and 242. A first and second conduit 251 and 252 extend through the column 70 and communicate with the first and second chambers 241 and 242, respectively.

FIG. 14 illustrates the closure receiver 132 in a lowered position. When a fluid is driven into the first chamber 241 through the first channel 251, the fluid filling the first chamber 241 forces the first chamber 241 to expand thereby raising the cylindrical barrel 136 relative to the column 70.

Figure 16:
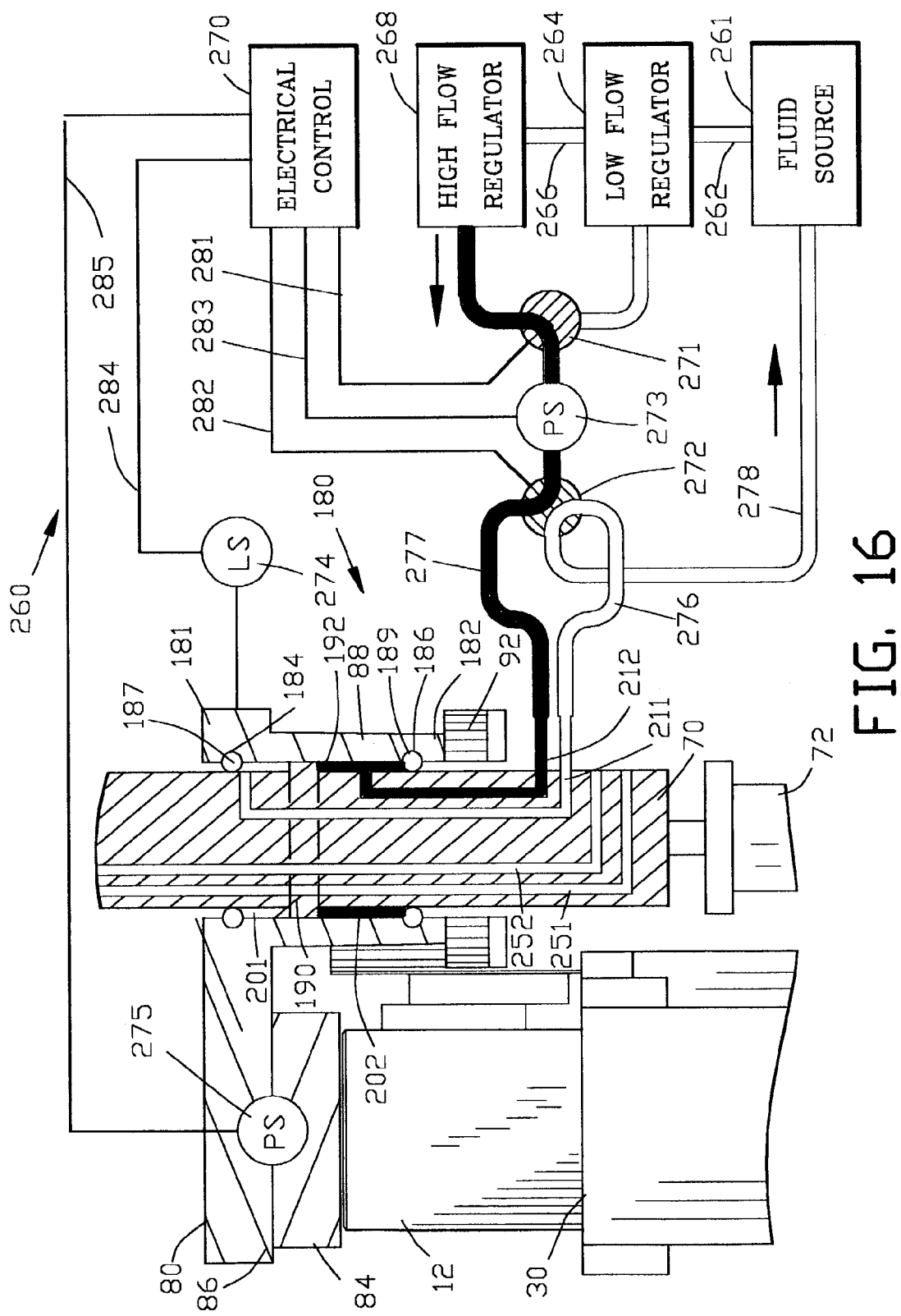
FIG. 16 is an enlarged view illustrating the platen being moved into a lowered position.

FIG. 14A illustrates the flow of the fluid into the first chamber 241 through the first channel 251. As the fluid is driven into the first chamber 241 through the first channel 251, the fluid is allowed to flow from the second chamber 242 through the second channel 252. The flow of the fluid into the first chamber 241 and the flow of the fluid from the second chamber 242 results in the closure receiver 132 being moved into the raised position as shown in FIG. 16.

Conversely, when a fluid is driven into the second chamber 242 through the second channel 252, the fluid filling the second chamber 242 forces the second chamber 242 to expand thereby lowering the cylindrical barrel 136 relative to the column 70. As the fluid is driven into the second chamber 242 through the second channel 252, the fluid is allowed to flow from the first chamber 241 through the first channel 251. The flow of the fluid into the second chamber 242 and the flow of the fluid from the first chamber 241 results in the closure receiver 132 being moved into the lowered position as shown in FIG. 14.

The vertical movement of the platen carrier 80 is accomplished by the platen carrier drive 180 in a manner similar to the vertical movement of the receiver carrier 130 by the receiver carrier drive 220. The elongation of the pinion gear or drive 94 enables the continuous engagement with the gear 92 independent of the vertical position of the column 70.

The first and second conduits 211 and 212 as well as the first and second conduits 251 and 252 extend through the column 70 and communicate with the first and second chambers 201 and 202 and the first and second chambers 241 and 242, respectively. Accordingly, all conduits 211 and 212 and 251 and 252 required for the vertical movement of the platen carrier 80 and the receiver carrier 130 on the column 70 are located internal the column 70. It should be appreciated by those killed in the art that the column 70 may be a shaft disposed in a horizontal orientation or the like.

Figure 15:
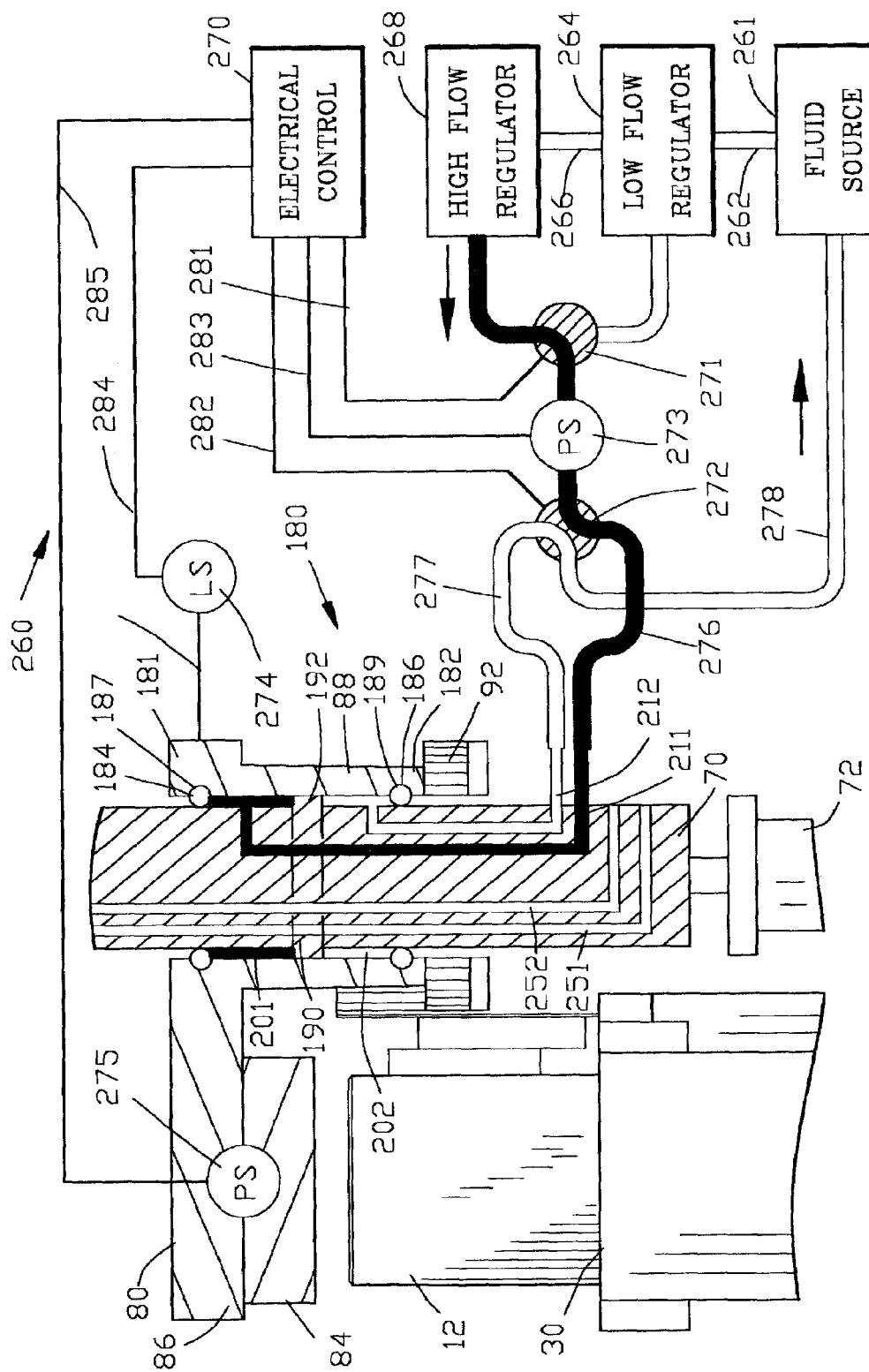
FIG. 15 is an enlarged view illustrating the platen in a raised position.
Figure 17:
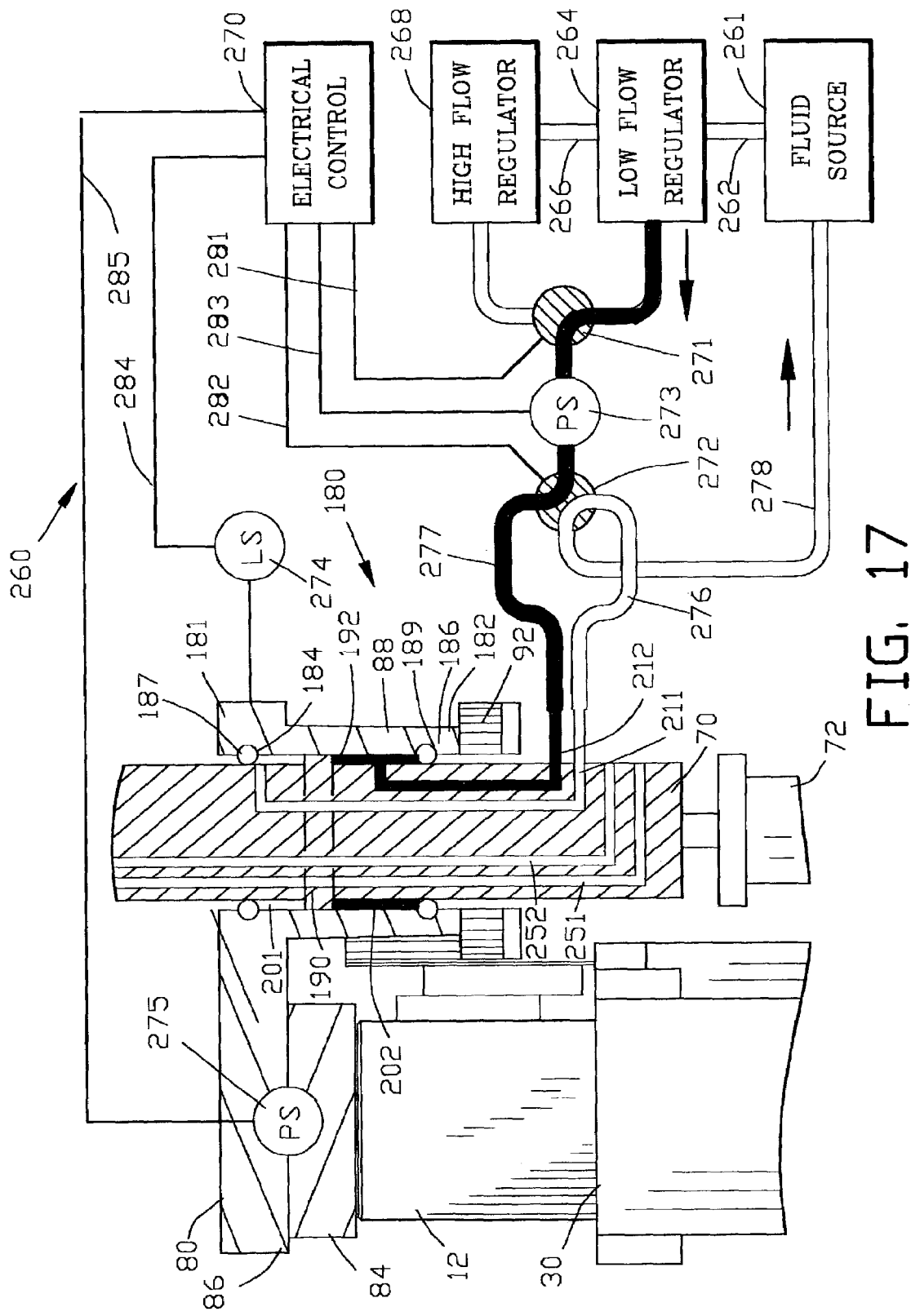
FIG. 17 is an enlarged view illustrating the platen being moved into engagement with the battery case.

FIGS. 15–17 illustrate a control system 260 for moving the platen carrier 80 and the receiver carrier 132 as shown in FIGS. 14 and 14A. Although the control system 260 is shown connected to the conduits 211 and 212 for vertically moving the platen carrier 80, it should be understood that the control system 260 may be used for moving the receiver carrier 130. Furthermore, although the control system 260 is shown controlling fluid actuators, it should be understood that the control system 260 may be used for controlling any type of actuators.

A fluid source 261 is connected by a conduit 262 to a low flow regulator 264. A conduit 266 connects the low flow regulator 264 to a high flow regulator 268. The outputs of the low flow regulator 264 and the high flow regulator 268 are connected to a first valve 271. The low flow rate regulator 264 provides a fluid under pressure having a low flow rate to the first valve 271. The high flow rate regulator 268 provides a fluid under pressure having a high flow rate to the first valve 271.

The first valve 271 is connected through a fluid pressure sensor 273 to a second valve 272. The output of the second valve 272 is connected by conduits 276 and 277 to the conduits 211 and 212 located within the column 70. Electrical connectors 281–283 connect the first and second valves 271 and 272 and the fluid pressure sensor 273 to the electrical control 270. A location sensor 274 is connected by an electrical connector 284 to the electrical control 270.

FIG. 15 is an enlarged view illustrating the platen carrier 80 and the case heater 84 being moved into a raised position at a high rate of speed. The high flow rate regulator 268 provides fluid under pressure having a high flow rate to the first valve 271. The first valve 271 connects the high flow rate fluid through the fluid pressure sensor 273 to the second valve 272. The second valve 272 directs the high flow rate fluid to the first chamber 201 for moving the platen carrier 80 and the case heater 84 into a raised position. The high flow rate fluid from the high flow rate regulator 268 moves the platen carrier 80 and the case heater 84 eat a high rate of speed. The location sensor 274 senses the position of the platen carrier 80.

FIG. 16 is an enlarged view illustrating the platen carrier 80 and the case heater 84 being moved into a lowered position at a high rate of speed. The high flow rate regulator 268 provides fluid under pressure having a high flow rate to the first valve 271. The first valve 271 connects the high flow rate fluid through the fluid pressure sensor 273 to the second valve 272. The second valve 272 directs the high flow rate fluid to the second chamber 202 for moving the platen carrier 80 and the case heater 84 into a lowered position. The high flow rate fluid from the high flow rate regulator 268 moves the platen carrier 80 and the case heater 84 at a high rate of speed. The location sensor 274 senses the position of the platen carrier 80.

FIG. 17 is an enlarged view illustrating the platen carrier 80 and the case heater 84 being moved into a lowered position at a low rate of speed. When the case heater 84 engages the battery case 12, an increase of pressure is sensed by the fluid pressure sensor 273. An output of the fluid pressure sensor 273 provides a signal along electrical connector 283 to the electrical control 270. The electrical control 270 activates the first valve 271 to move to the position shown in FIG. 17.

The low flow rate regulator 264 provides fluid under pressure having a low flow rate to the first valve 271. The first valve 271 connects the low flow rate fluid through the fluid pressure sensor 273 to the second valve 272. The second valve 272 directs the low flow rate fluid to the second chamber 202 for moving the platen carrier 80 and the case heater 84 into a lowered position. The low flow rate fluid from the low flow rate regulator 264 moves the platen carrier 80 and the case heater 84 at a low rate of speed. The location sensor 274 senses the position of the platen carrier 80.

The low flow rate fluid from the low flow rate regulator 264 moves the platen carrier 80 and the case heater 84 at a low rate of speed after engagement with the battery case 12. The low rate of speed of the platen carrier 80 after engagement with the battery case 12 enables the case heater 84 to move at a slow rate of speed during the heating and melting of the battery case 12. The case heater 84 moving at a slow rate of speed during the heating and melting of the battery case 12 insures an accurate and total heating and an accurate and total heating of the upper periphery of the battery case 12.

The use of the high flow rate regulator 268 and a low flow rate regulator 264 provides fluid under pressure having a high flow rate to move the case heater 84 at a high rate of speed toward the battery case 12 and to move the case heater 84 at a low rate of speed after engagement with the battery case 12.

An alternate pressure sensor 275 is located between the platen carrier 80 and case heater 84. The alternate pressure sensor 275 sense a pressure caused by the contact between the case heater 84 and the battery case 12. The alternate pressure sensor 275 is an alternate to the fluid pressure sensor 273. An output of the alternate pressure sensor 275 provides a signal along electrical connector 285 to the electrical control 270. The electrical control 270 activates the first valve 271 to move to the position shown in FIG. 17. Although the pressure sensors 273 and 275 have been shown as fluid pressure sensors, it should be understood that optical, magnetic, electrical or mechanical pressure sensors may be incorporated within the present invention.

Figure 18:
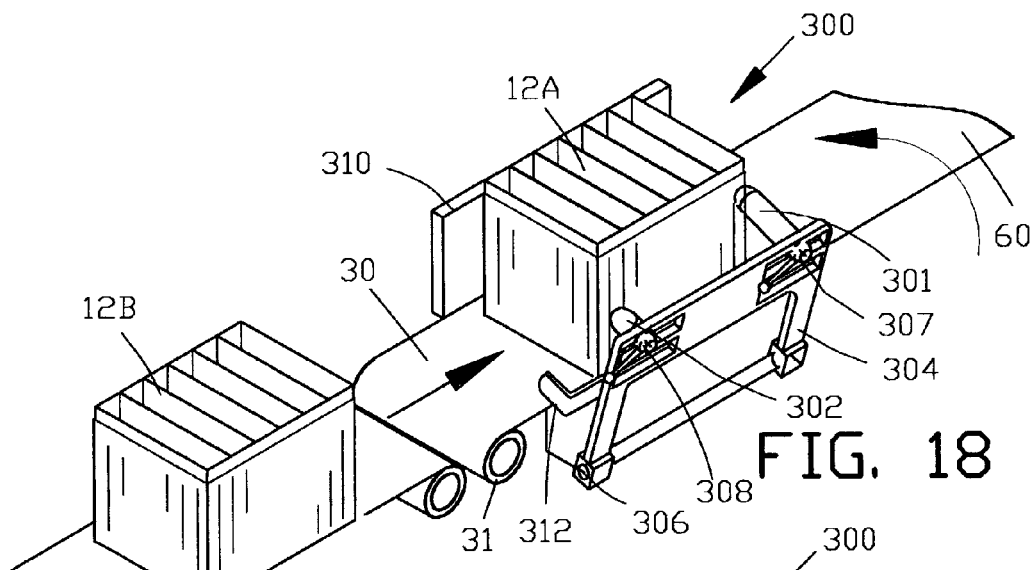
FIG. 18 is an enlarged isometric view of a battery case stop in a first position.

FIG. 18 is an enlarged isometric view of the first battery case 12A on the conveyor 30 with case stop 300 being disposed in a first position. The case stop 300 comprises a major case stop 301 and a minor case stop 302 located on a stop frame 304. A spacer stop 312 is positioned on the stop frame 304. The stop frame 304 is mounted for pivotable movement on a pivot 306 relative to the frame 25 and the conveyor 30. The major case stop 301 is adjusted by the adjustment 307 for stopping the first battery case 12A in the proper location. An adjustment 308 allows the positioning of the minor case stop 302.

FIG. 18 illustrates the first battery case 12A being moved on conveyor 30 to strike the major case stop 301. The major case stop 301 is longer than the minor case stop 302 allowing the major case stop 301 to stop the first battery case 12A as shown in FIG. 18, while the first battery case 12A passes by the minor case stop 302.

Figure 19:
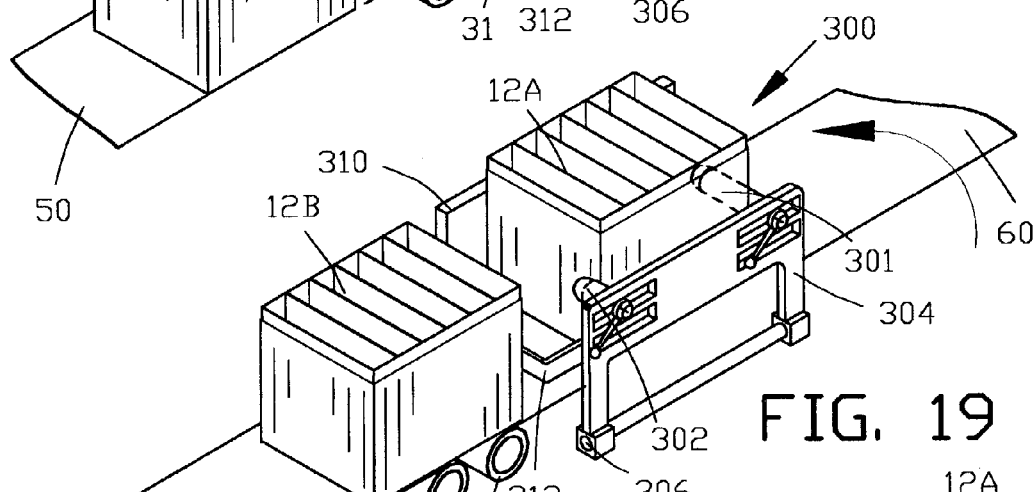
FIG. 19 is an enlarged isometric view of a battery case stop in a second position.

FIG. 19 illustrates the pivoting of the stop frame 304 on pivot 306 to move the first battery case 12A into engagement with a side stop 310. In addition, the minor case stop 302 positions the first battery case 12A between the major case stop 301 and the minor case stop 302 and press against the side stop 310.

When the stop frame 304 is in the position as shown in FIG. 19, the first battery case 12A is held in position between the major and minor case stops 301 and 302, the stop frame 304 and side stop 310. Accordingly, the first battery case 12A is immobilized during the heating and sealing operation. The spacer stop 312 functions to stop the second battery case 12B to maintain a space between the first battery case 12A and the second battery case 12B.

Figure 20:
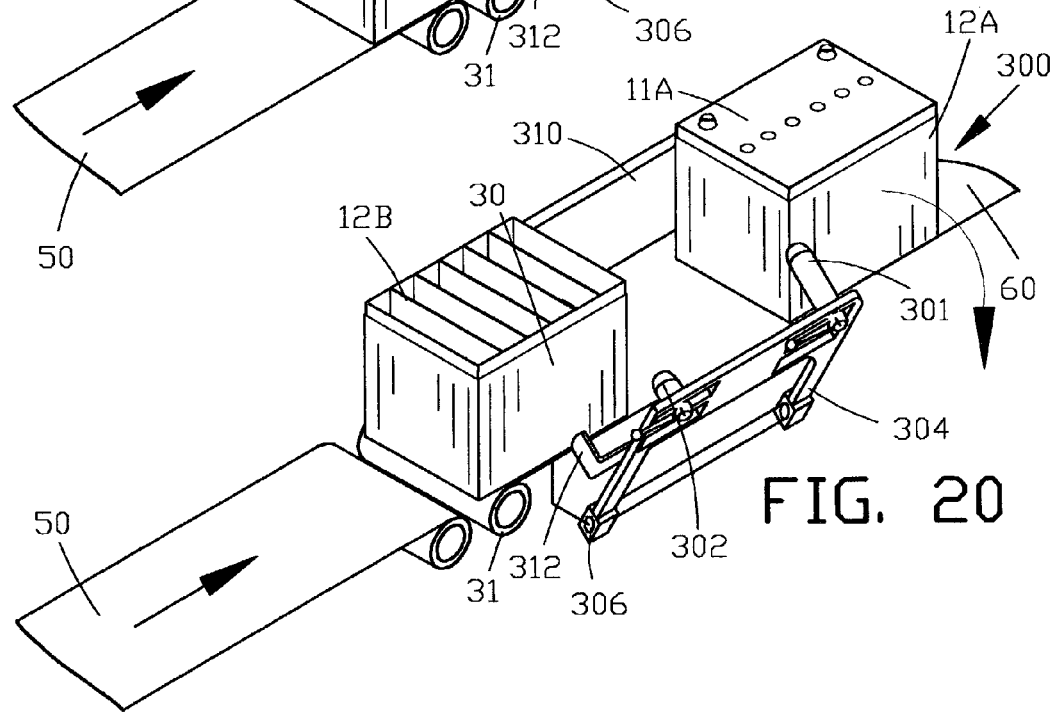
FIG. 20 is an enlarged isometric view of a battery case stop in a third position.

FIG. 20 illustrates the movement of the stop frame 304 into a third position whereat the first battery case 12A containing the case closure 11A is allowed to pass by the major case stop 301. When the stop frame 304 is placed into position as shown in FIG. 20, the first battery case 12A and the case closure 11A is allowed to be moved from the conveyor 30 to the output conveyor 60.

The stop frame 304 is moved into the position as shown in FIG. 18 for enabling the major case stop 301 to interrupt the movement of the second battery case 12B. Concomitantly therewith, the second battery case 12B is moved on the horizontal conveyor 30 as shown in FIG. 20. After the first battery case 12A with the case closure 11A passes the major case stop 301, the stop frame 304 is moved into position as shown in FIG. 18 enabling the major case stop 301 to stop the movement of the second battery case 12B on the horizontal conveyor 30.

The stop frame 304 and the major and minor battery case stops 301 and 302 secure the battery case in proper position for the heating and sealing process. The adjustments 307 and 308 enable the rapid change of the major and minor stops 301 and 302 for cases of various sizes.

Figure 21:
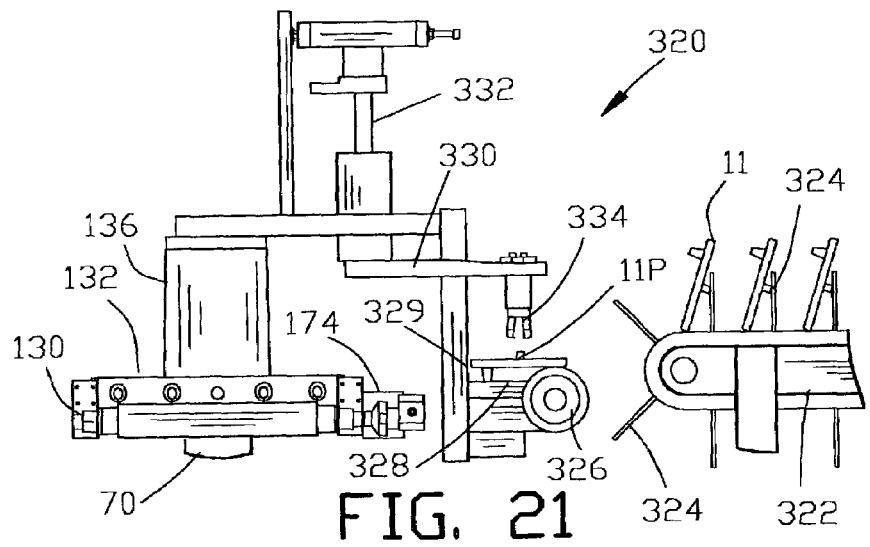
FIG. 21 is an enlarged partial view of FIG. 1 illustrating a battery case closure loader assembly in a first position.
Figure 22:
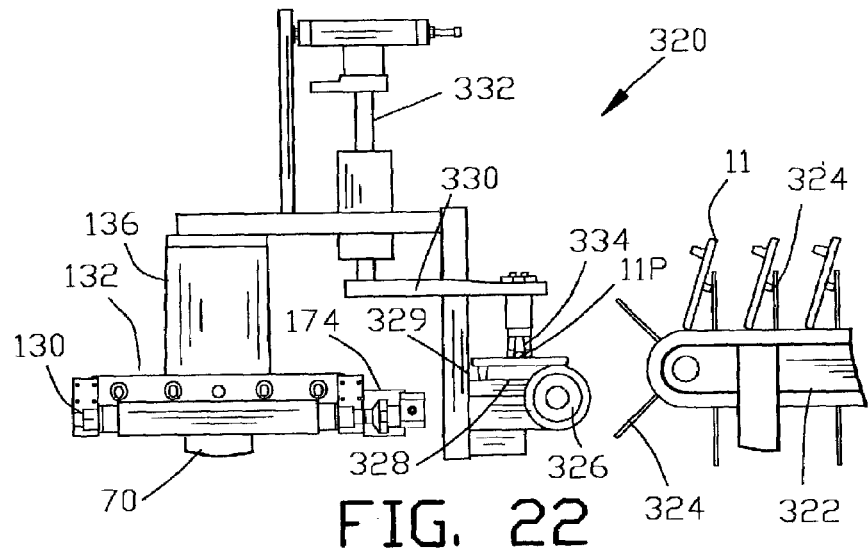
FIG. 22 is a view illustrating the battery case closure loader assembly in a second position.

FIGS. 21–26 illustrate in greater detail the operation of a closure loader 320 for automatically loading battery case closures 11 onto the closure receiver 132. The closure loader 320 comprises an indexable conveyor 322 having a plurality of separators 324 for receiving a battery case closure 11 between adjacent separators 324. Upon indexing of a separator 324 to a horizontal position, a drive wheel 326 moves the closure onto a plate 328 against the stop 329. The plate 328 and stop 329 properly position the battery case closure for grasping by the apparatus as will be hereinafter described. The closure loader 320 comprises an arm 330 pivotably mounted on a shaft 332 and vertically movable between a retracted position as shown in FIG. 21 and extended position as shown in FIG. 22. The arm 330 supports a jaw 334 for grasping a portion of the battery case closure 11 such as a projection 11P extending from each of the battery case closures 11.

FIG. 21 illustrates the battery case closure 11A resting in the support 328 against the stop 329 The arm 330 is in the retracted position and rotatably disposed above the projection 11P of the battery case closure 11A.

FIG. 22 illustrates the movement of the arm 330 from the retracted position as shown in FIG. 21 to the extended position as shown as FIG. 22. The jaws 334 grasp the projection 11P of the battery case closure 11A.

Figure 23:
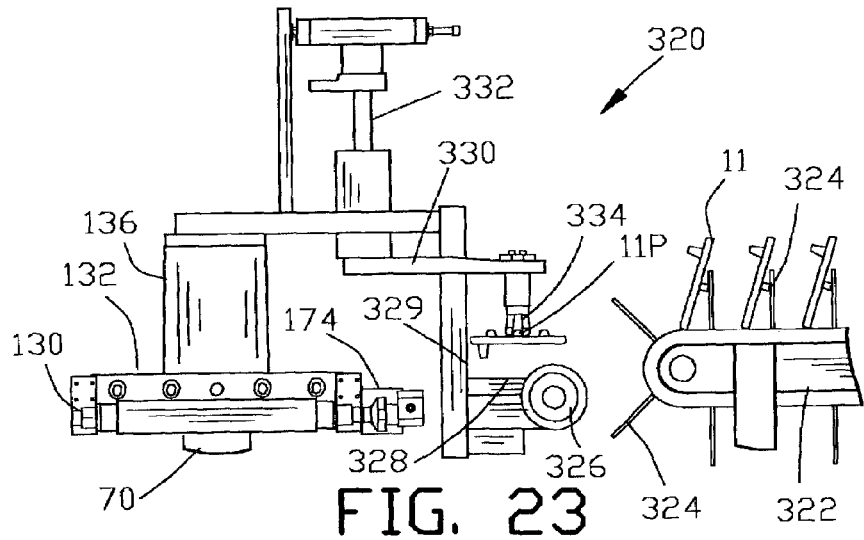
FIG. 23 is a view illustrating the battery case closure loader assembly in the first position with a battery case closure thereon.

FIG. 23 illustrates the movement of the arm 330 from the extended position to the retracted position thereby lifting the battery case closure 11A from the surface 328.

Figure 24:
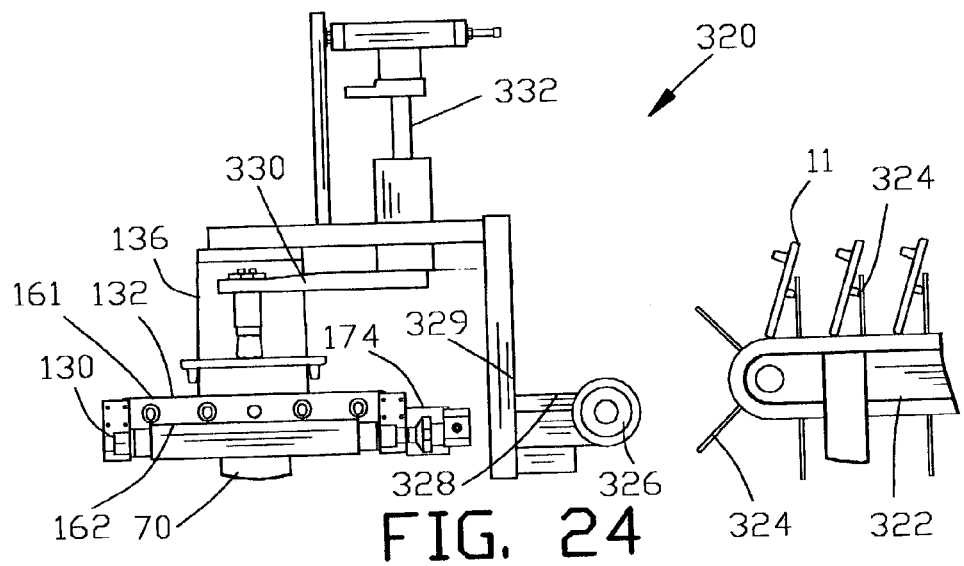
FIG. 24 is a view illustrating the battery case closure loader assembly in a third position with the battery case closure thereon.

FIG. 24 illustrates the rotation of the arm 330 on shaft 332. The battery case closure 11A is positioned over the first closure receiver portion 161 of the closure receiver 132.

Figure 25:
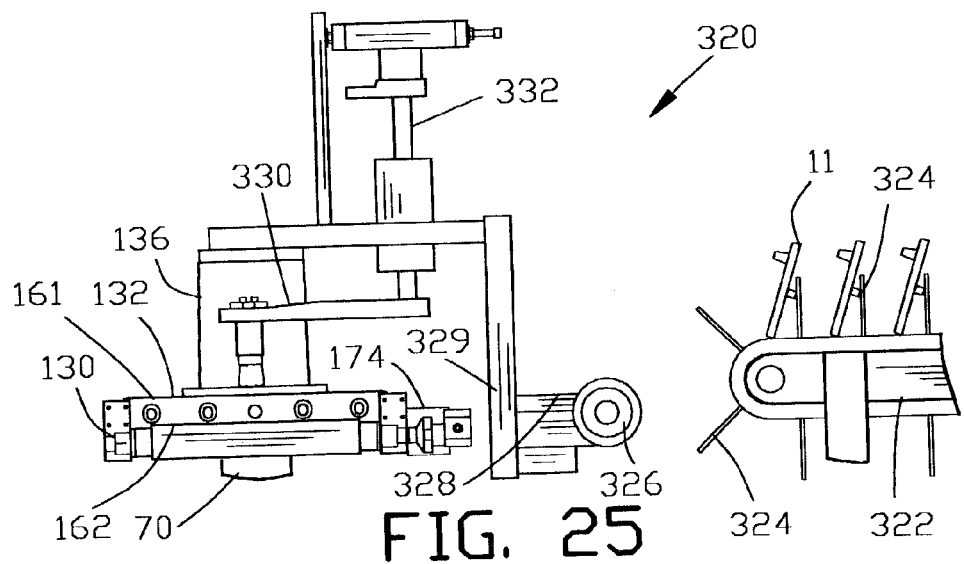
FIG. 25 is a view illustrating the battery case closure loader assembly in a fourth position for placing the battery case closure on a closure receiver.

FIG. 25 illustrates the movement of the arm 330 from the retracted position to the extended position to deposit the battery closure 11A onto the first closure receiver portion 161 of the closure receiver 132. The battery closure 11A is retained on the closure retainer 166 by the plurality of vacuum cups 168 as heretofore described.

Figure 26:
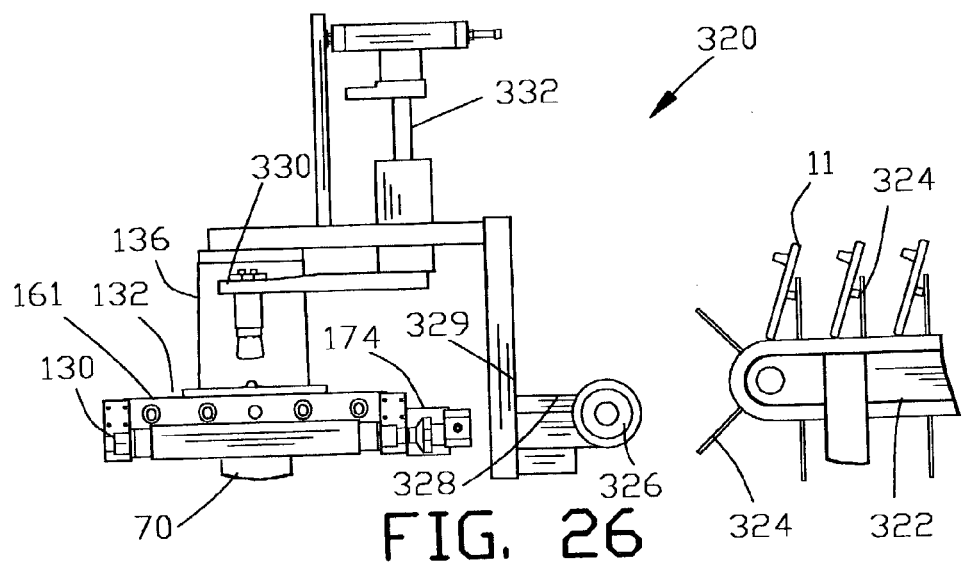
FIG. 26 is a view illustrating the battery case closure loader assembly in a third position with the battery case closure thereon.

FIG. 26 illustrates the movement of the arm 330 into the retracted position. The arm 330 may then be rotated into the position as shown in FIG. 21 to repeat the cycle to load the battery closure 11B onto the second closure receiver portion 162.

FIGS. 27–38 illustrate the sequence of operation of the apparatuses heretofore described.

Figure 27:
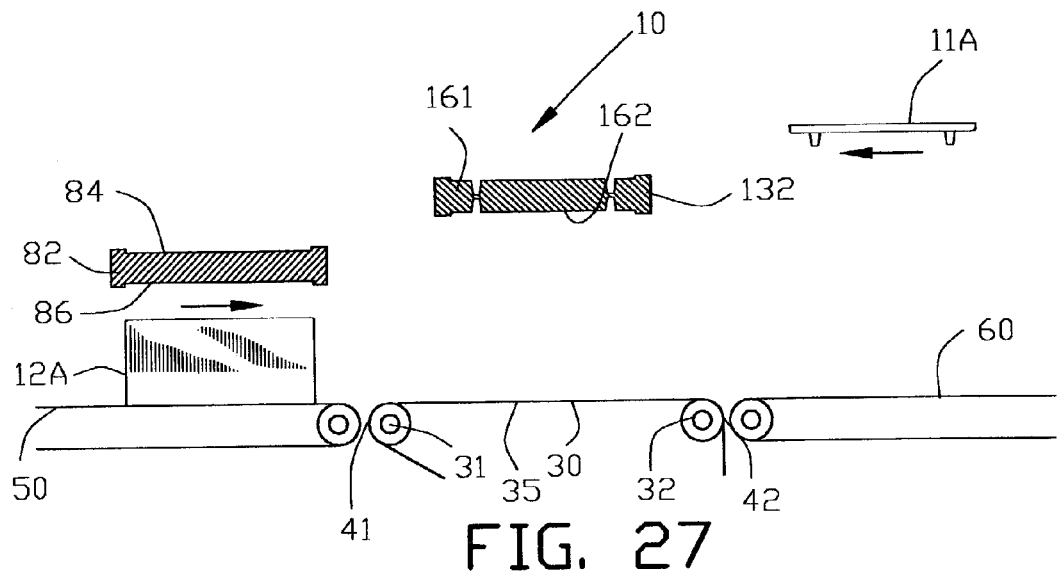
FIG. 27 is a diagram of the present apparatus illustrating an initial state of the apparatus.

FIG. 27 illustrates the initial condition with the battery case 12A on the input conveyor and the battery case closure 11A positioned on the closure loader 320.

Figure 28:
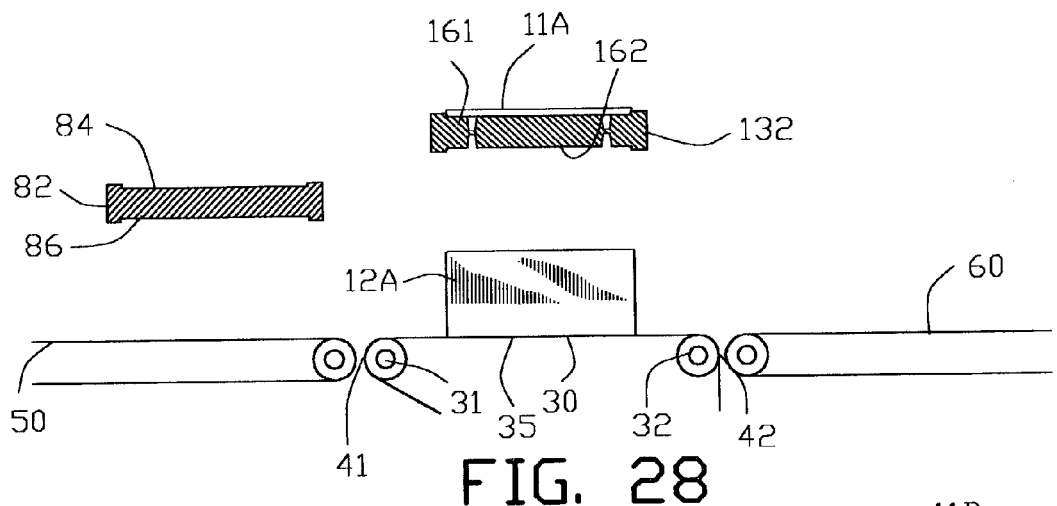
FIG. 28 is a diagram of the present apparatus illustrating a first battery case closure place on a first closure receiver portion as well the movement of a first battery case.

FIG. 28 illustrates the movement of the battery case 12A from the input conveyor 50 to the horizontal conveyor 30. The battery case 12A will be positioned by the stops as described with references to FIGS. 18–20. Concomitantly therewith, the battery case closure 11A is placed on the first closure receiving portion 161 of the closure receiver 132. The closure 11A is placed upon the closure receiver 132 in a manner similar to the closure loader 320 shown in FIGS. 21-26.

Figure 29:
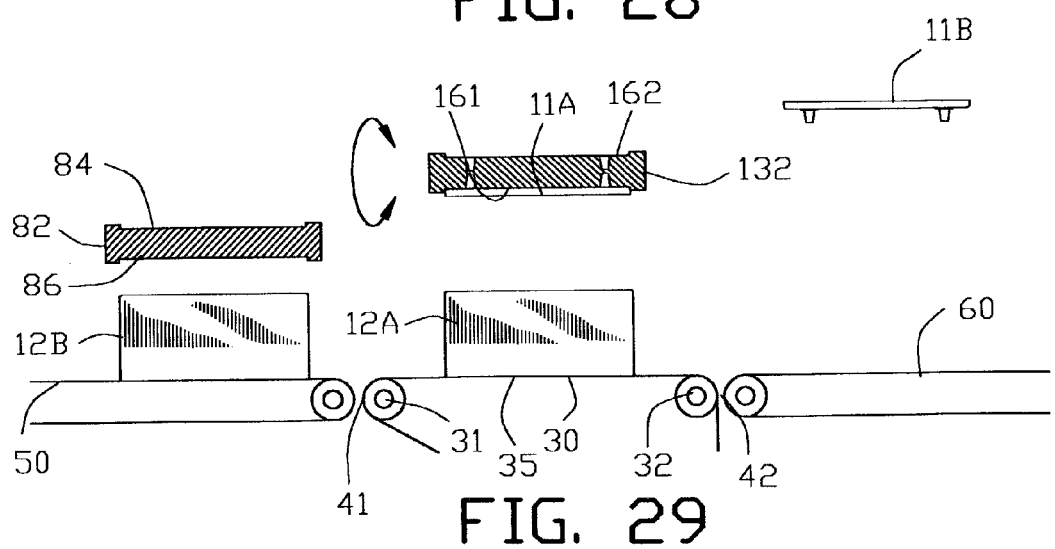
FIG. 29 is a diagram of the present apparatus illustrating a rotation of the second carrier portion.

FIG. 29 illustrates the rotation of the closure receiver 132 on the rotatable mounts 171 and 172 shown in FIGS. 10 and 11. FIG. 29 also illustrates the movement of a second battery case 12B onto the input conveyor 50.

Figure 30:
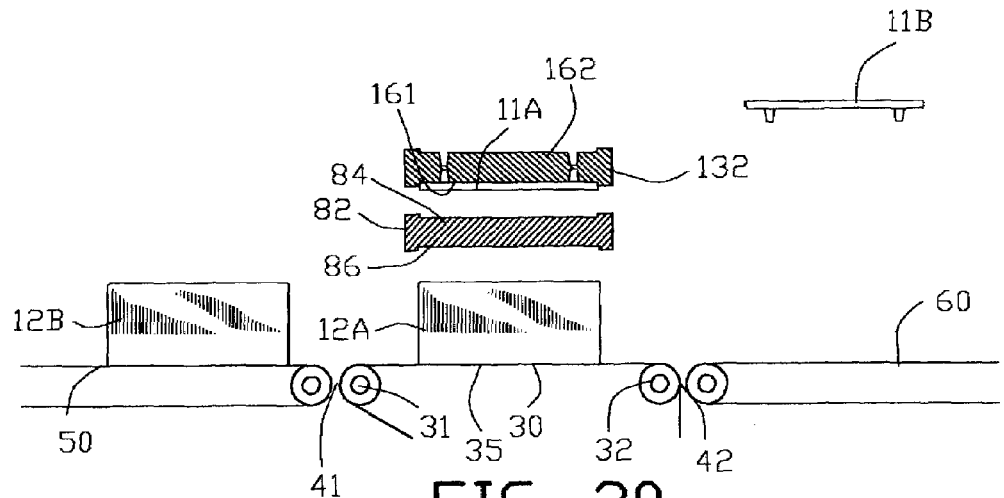
FIG. 30 is a diagram of the present apparatus illustrating the rotational movement of the movement of the heating platen.

FIG. 30 shows the movement of the platen 82 into a position disposed between the battery case 12A and the battery case closure 11A. The movement of the platen 82 is a rotational movement on the column 70 as shown with reference to FIGS. 5A to 6B.

Figure 31:
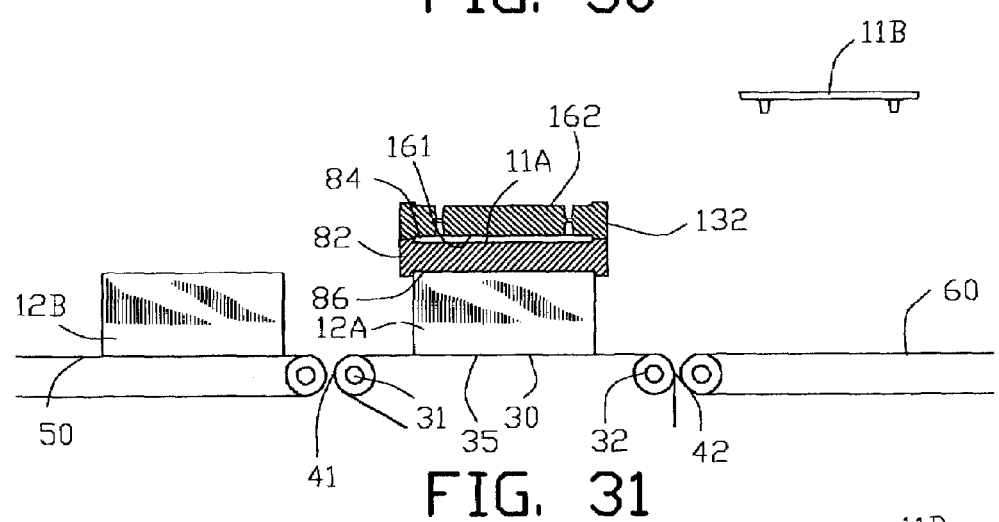
FIG. 31 is a diagram of the present apparatus illustrating the vertical movement of the second carrier portion and the vertical movement of the heating platen for heating the first battery case closure and the first battery case.

FIG. 31 illustrates the downward movement of the platen 82 and the closure receiver 132 as the case heater 84 heats the upper periphery of the battery case 12A and whereat the closure heater 86 heats the lower periphery of the battery case closure 11A. The vertical movement of the platen 82 and the closure receiver 132 is shown with reference to FIGS. 14 and 14A.

Figure 32:
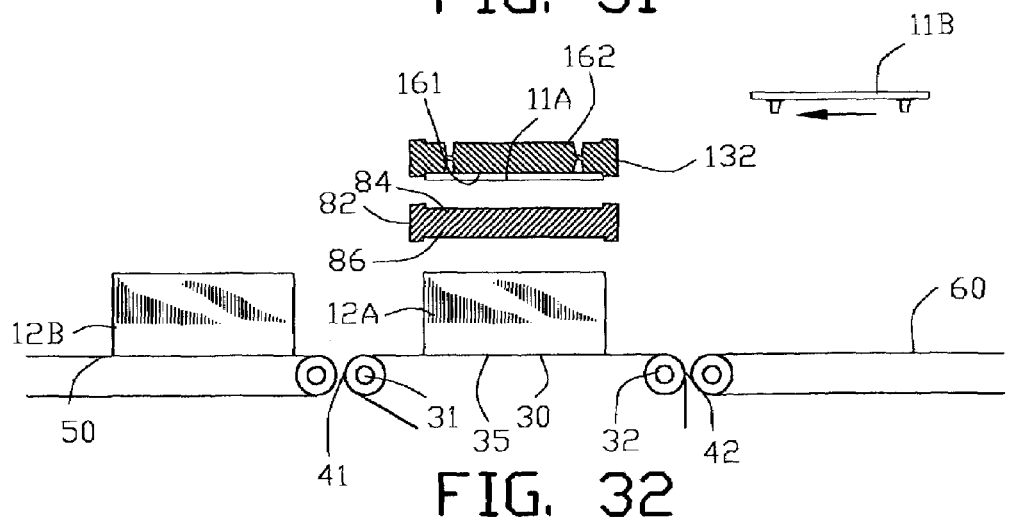
FIG. 32 is a diagram of the present apparatus illustrating the vertical movement of the heating platen and the vertical movement of the closure receiver for removing the heating platen from the first battery case and the first closure.

FIG. 32 illustrates the movement of the platen 82 into a second vertical position and the movement of the closure receiver 132 into a fourth vertical position.

Figure 33:
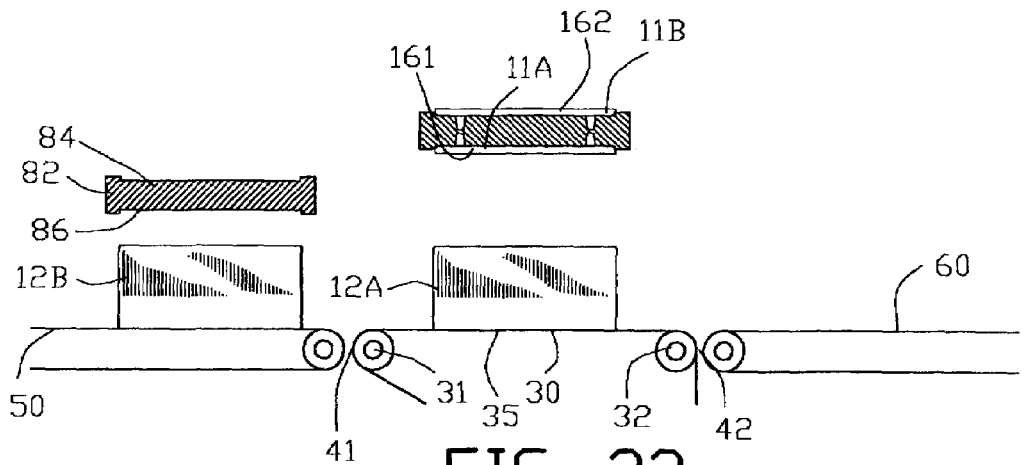
FIG. 33 is a diagram of the present apparatus illustrating the rotational movement of the heating platen.

FIG. 33 illustrates the rotational movement of the platen 82 from a first rotational movement to a second rotational position on the column 70 as heretofore described. FIG. 33 also illustrates the insertion of a battery case closure 11B onto the second closure receiving portion 162 of the closure receiver 132.

Figure 34:
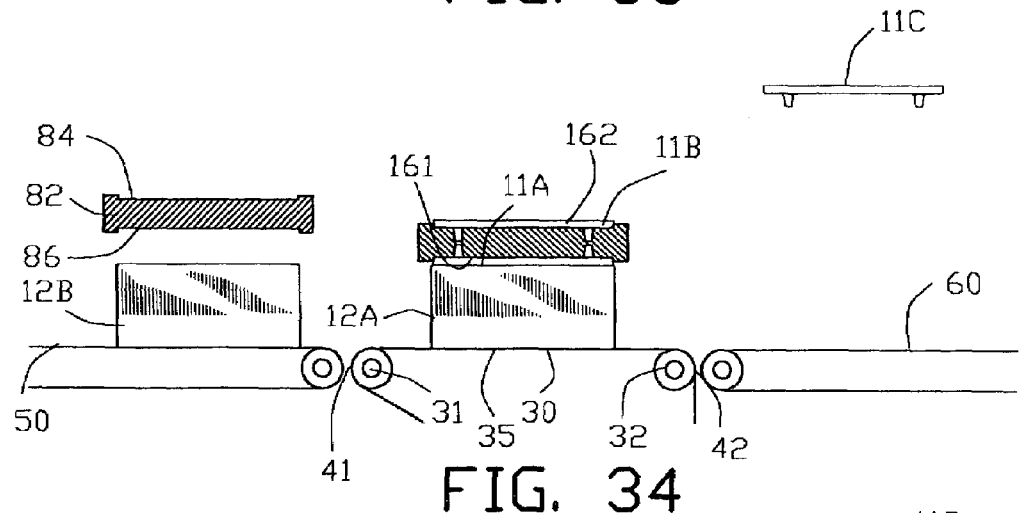
FIG. 34 is a diagram of the present apparatus illustrating the vertical movement of the closure receiver for sealing the first closure to the first battery case.

FIG. 34 illustrates the downward movement of the closure receiver 132 for engaging the closure 11A with the battery case 12A for sealing the battery case closure to the battery case.

Figure 35:
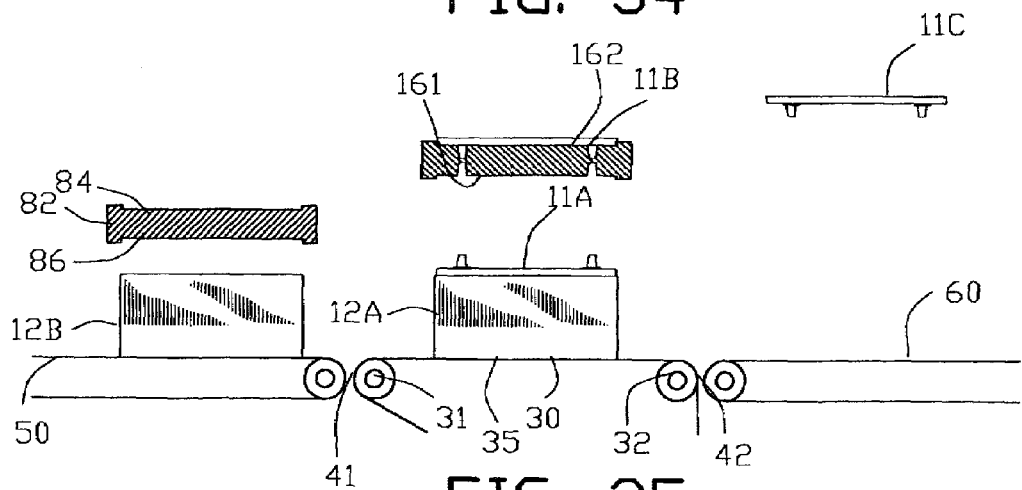
FIG. 35 is a diagram of the present apparatus illustrating the withdrawal of the carrier receiver and the movement of the first battery case.

FIG. 35 illustrates the movement of the closure receiver 132 from the third vertical position to the fourth vertical position after the battery case closure 11A is sealed to the battery case 12A.

Figure 36:
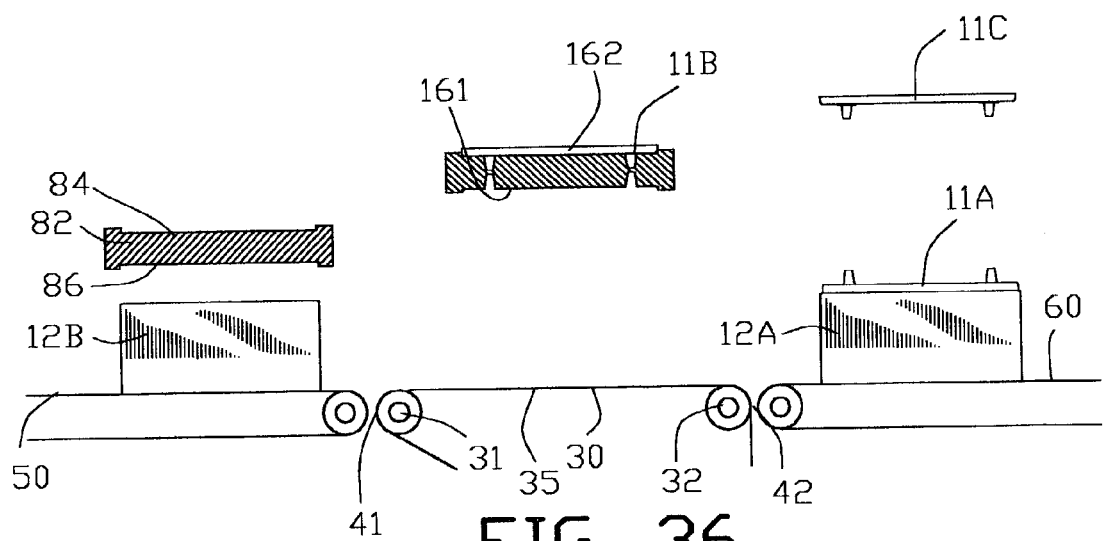
FIG. 36 is a diagram of the present apparatus illustrating a second closure place on a second closure receiver portion.

FIG. 36 illustrates the movement of the battery case 12A and associated battery case closure 11A from the horizontal conveyor 36 to the output conveyor 60.

Figure 37:
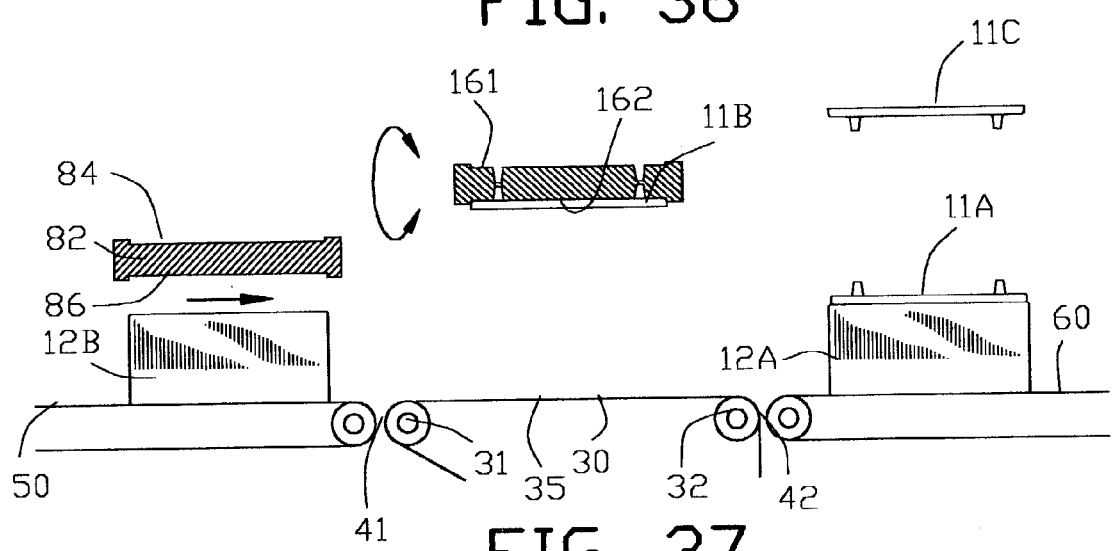
FIG. 37 is a diagram of the present apparatus illustrating the rotation of the second carrier portion.

FIG. 37 shows the rotation of the case closure receiver 132 such that the second closure receiving portion 162 is facing in a downward direction.

Figure 38:
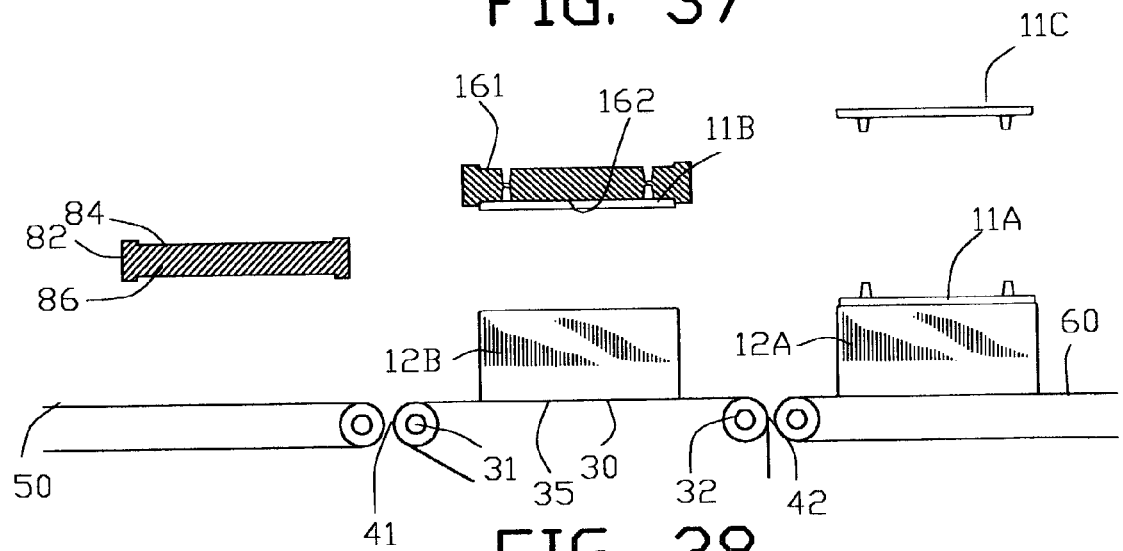
FIG. 38 is a diagram of the present apparatus illustrating the movement of the second battery case.

FIG. 38 illustrates the movement of the battery case 12B from the input conveyor to the horizontal conveyor 32. It should be apparent that the sequence can now be repeated for sealing the battery case closure 11B to the battery case 12B.

The foregoing apparatus has disclosed a simple and reliable machine for heat sealing a battery case closure to a battery case. It should be appreciated by those skilled in the art that the various aspects of the apparatus may be automated and be computer controlled. Conversely, when desired, the many aspects of the machine could be operated under a manual control.

The operation of the apparatus provides extremely good alignment due to the fact that all movements are substantially centered around a central column 70. Furthermore, both the platen 82 and the closure receiver are allowed to pivot in two dimensions for allowing for various tolerances in the battery case and/or closure. The unique aspects of the quick change of the platen and the closure receiver allows the apparatus to be changed over for accommodating different size batteries. In addition, the use of fluid channels within the column greatly simplify the hydraulics of the apparatus and enhance the reliability to virtually eliminate hydraulic leaks within the column. The apparatus operates at a very high speed and is very compact allowing the apparatus to be installed in virtually any battery assembly facility.

Although the apparatus has been described with reference to a case heater 84 for sealing the battery case closure 11 to the battery case 12, it should be understood that other types of sealing methods may be used such as ultrasonic welding or solvent bonding to secure the battery case closure 11 to the battery case 12. In such a situation, the case heater 84 may be removed and a sealer such as an ultrasonic welder or solvent dispenser is inserted into the apparatus in place of the case heater 84 as heretofore described.

Although the invention has been described in its preferred form with a certain degree of particularity, it is understood that the present disclosure of the preferred form has been made only by way of example and that numerous changes in the details of construction and the combination and arrangement of parts may be resorted without departing from the spirit and scope of the invention.

What is claimed is:

1. A case stop for stopping and positioning a battery case on a support, comprising:
   a stay frame being movably mounted relative to the support;
   a major and a minor case stop located on said stop frame;
   said major case stop initially positioning the battery case upon initial movement of said stop frame;
   said minor case stop subsequently positioning the battery ease upon continued movement of said stop frame; and
   said support being a moving conveyor and including a spacer stop secured to said stop frame for spacing a subsequent battery case moving on said conveyor relative to the battery case.

2. A case stop for a battery case as set forth in claim 1, wherein said stop frame is pivotably mounted relative to the support.

3. A case stop for a battery case as set forth in claim 1, wherein said major case stop is larger than said minor case stop for enabling said major case stop to initially position the battery case upon initial movement of said stop frame.

4. A case stop for a battery case as set forth in claim 1, wherein said major case stop and said minor case stop engage opposed sides of the battery case; and
   said minor case stop being adjustable for accommodating a different size battery case.

5. A case stop for a battery case as set forth in claim 1, including a side stop for engaging with the battery case for securing and immobilizing the battery case position on the support; and
   said side stop and said stop frame being on opposite sides of the battery case.

* * * * *